United States Patent [19]
Wagner et al.

[11] Patent Number: 6,055,163
[45] Date of Patent: Apr. 25, 2000

[54] COMMUNICATIONS PROCESSOR REMOTE HOST AND MULTIPLE UNIT CONTROL DEVICES AND METHODS FOR MICROPOWER GENERATION SYSTEMS

[75] Inventors: Edward T. Wagner, Chestertown, Md.; Thomas C. Matty, North Huntingdon, Pa.; Thomas C. Underwood, Laurel; William B. Hall, Annapolis, both of Md.

[73] Assignee: Northrop Grumman Corporation, Los Angeles, Calif.

[21] Appl. No.: 09/140,392

[22] Filed: Aug. 26, 1998

[51] Int. Cl.[7] .............................. H02M 5/45; H02J 3/36; G05F 1/10; G05B 24/02
[52] U.S. Cl. ............................. 363/37; 363/35; 323/241; 323/320; 323/322
[58] Field of Search ................................ 363/37, 34, 35; 323/320, 322, 234, 237, 241

[56] References Cited

U.S. PATENT DOCUMENTS

| | | | |
|---|---|---|---|
| 4,527,045 | 7/1985 | Nakajima et al. | 323/241 |
| 5,045,988 | 9/1991 | Gritter et al. | 363/35 |
| 5,068,811 | 11/1991 | Johnston et al. | 323/241 |
| 5,134,307 | 7/1992 | Nakano | 363/37 |
| 5,184,025 | 2/1993 | McCurry et al. | 363/65 |
| 5,610,509 | 3/1997 | Nustad | 323/234 |
| 5,612,580 | 3/1997 | Janonis et al. | 307/64 |

*Primary Examiner*—Peter S. Wong
*Assistant Examiner*—Bao Q. Vu

[57] ABSTRACT

A communications processor is disclosed for a power generation system that permits data and control signals to be communicated to and from the power generation system and a host computer. The control signals include a power level command and power factor that are sent from a remote host to the power generation system which responds by delivering the requested power level having the desired power factor to a grid. The remote host receives performance data that permits an operator to accurately gauge the performance of the power generation system including the performance and any fault conditions of a line power unit, generator, and engine driving the generator. The communications processor unburdens the line power unit controller that is responsible for controlling power generation from the task of processing input data and driving local displays. The host may also be provided at a location remote from the power generation system. The host, local or remote, preferably includes a graphical user interface that permits an operator to monitor and control the power generation system in an efficient and highly effective manner. A dedicated serial bus connects the communications processors of multiple power generation systems. By utilizing a round-robbin polling of each power generation system across the dedicated serial bus, real-time control can be achieved.

41 Claims, 30 Drawing Sheets

ITG HOST

File  Options  DataLogs  ComPorts  Phone  View  Help

- ✓ Com1
- Com2
- Com3
- Com4
- Close

Host Data:

ITG Unit ID: ALPHA 0

Mode Command: NO CHANGE

Power Command: 0 Percent

Current Time: 07:41
☐ Set Time: Tue 06-09-98

ON Time:
☐ Set Time:

OFF Time:
☐ Set Time:

Report Time:
☐ Hourly
☐ Set Time:

Report Phone Number:

DATA ONLY ACCESS (NO MODEM)

Send >>>

COM PORTS
Status:
COM1 OPEN
Checksum:
- - -
Errors:
NO CARRIER

Industrial Turbo Generator Data

ITG Unit ID: — —
Keyswitch Posn: —
Power Setpoint: — — kW
Contactor Status: —
Utility Auth: —
Mode: —
Output Power: — — kW
Fault Code: —
Current Time: —
Current Date: —

Voltage: — Volts DC
Current: — Amps DC
Speed: — RPM
Starter Speed: — RPM
C.P. #1 Temp: — Deg. F
C.P. #2 Temp: — Deg. F

*FIG. 9(b)*

ITG HOST

File  Options  DataLogs  ComPorts  Phone  View  Help

Host Data:

ITG Unit ID: ALPHA 00
Mode Command: NO CHANGE
Power Command: 0 Percent

Current Time: 07:41  Tue 06-09-98
☐ Set Time

ON Time
☐ Set Time

OFF Time
☐ Set Time

Report Time
☐ Hourly
☐ Set Time

Report Phone Number: _____

DATA ONLY ACCESS (NO MODEM)

Industrial Turbo Generator Data

ITG Unit ID: —
Keyswitch Posn: —
Power Setpoint: — kW
Contactor Status: —

ITG EVENT LOG RETRIEVAL

Setup

Number of Records: 1
(1-1000)

Number of Records: 1
(1-Oldest)

[START]  [CANCEL]

File Status

Processing Record #: ☐

ITG HOST

File  Options  DataLogs  ComPorts  Phone  View  Help

Exit

Data:

ITG Unit ID: ALPHA 00

Mode Command: NO CHANGE

Power Command: 0 Percent

Current Time: 07:41
☐ Set Time: Tue 06-09-98

ON Time:
☐ Set Time:

OFF Time:
☐ Set Time:

Report Time:
☐ Hourly
☐ Set Time:

Report Phone Number:

NO HOST TO TURBOGENERATOR COMMUNICATION

DATA ONLY ACCESS (NO MODEM)

Send >>>

COM PORTS
Status: COM1 OPEN
Checksum: ---
Errors:

NO CARRIER

Industrial Turbo Generator Data

| ITG Unit ID: | – |
| Keyswitch Posn: | – |
| Power Setpoint: | – – kW |
| Contactor Status: | – |
| Utility Auth: | – |
| Mode: | – |
| Output Power: | – – kW |
| Fault Code: | – |
| Current Time: | – |
| Current Date: | – |
| Voltage: | – Volts DC |
| Current: | – Amps DC |
| Speed: | – RPM |
| Starter Speed: | – RPM |
| C.P. #1 Temp: | – Deg. F |
| C.P. #2 Temp: | – Deg. F |

*FIG.9(h)*

ITG HOST

File  Options  DataLogs  ComPorts  Phone  View  Help

Dial
Hangup
Setup Numbers

ACCESS
(NO MODEM)

Host Data:

ITG Unit ID:           ALPHA 00
Mode Command:    NO CHANGE
Power Command:   0    Percent Current Time    07:41
☐ Set Time    Tue 06-09-98
ON Time
☐ Set Time
OFF Time
☐ Set Time
Report Time
☐ Hourly
☐ Set Time Report Phone Number:

Send >>>

―― Industrial Turbo Generator Data ――

ITG Unit ID:            —
Keyswitch Posn:       —
Power Setpoint:        —  —  kW
Contactor Status:     —
Utility Auth:           —
Mode:                   —
Output Power:         —  —  kW
Fault Code:            —
Current Time:         —
Current Date:         —

Voltage:               —  —  Volts DC
Current:               —  —  Amps DC
Speed:                 —  —  RPM
Starter Speed:        —  —  RPM
C.P. #1 Temp:        —  —  Deg. F
C.P. #2 Temp:        —  —  Deg. F COM PORTS
Status:
COM1 OPEN
Checksum:
---
Errors:
       NO
    CARRIER

*FIG.9(j)*

ITG HOST

File  Options  DataLogs  ComPorts  Phone  View  Help

Host Data:

ITG Unit ID: ALPHA 00
Mode Command: NO CHANGE
Power Command: 0 Percent

Current Time: 07:41  Tue 06-09-98
☐ Set Time
ON Time
☐ Set Time
OFF Time
☐ Set Time
Report Time
☐ Hourly
☐ Set Time
Report Phone Number:

NO HOST TO TURBOGENERATOR COMMUNICATION

DATA ONLY ACCESS (NO MODEM)

Send >>>

COM PORTS
Status: COM1 OPEN
Checksum: ---
Errors:

NO CARRIER

Industrial Turbo Generator Data

ITG Unit ID: -- --
Keyswitch Posn: --
Power Setpoint: -- -- kW
Contactor Status: --
Utility Auth: --
Mode: --
Output Power: -- -- kW
Fault Code: --
Current Time: -- --
Current Date: -- --

ECU Sensor Faults:

*FIG. 9(1)*

ITG HOST

File  Options  DataLogs  ComPorts  Phone  View  Help

Host Data:

ITG Unit ID: ALPHA 00

Mode Command: NO CHANGE

Power Command: 0 Percent

Current Time: 07:41
☐ Set Time: Tue 06-09-98

ON Time:
☐ Set Time:

OFF Time:
☐ Set Time:

Report Time:
☐ Hourly
☐ Set Time:

Report Phone Number:

NO HOST TO TURBOGENERATOR COMMUNICATION

DATA ONLY ACCESS (NO MODEM)

Send >>>

COM PORTS
Status: COM1 OPEN
Checksum: ---
Errors:

NO CARRIER

Industrial Turbo Generator Data

ITG Unit ID: – –
Keyswitch Posn: – –
Power Setpoint: – – kW
Contactor Status: – –
Utility Auth: – –
Mode: – –
Output Power: – – kW
Fault Code: – –
Current Time: – –
Current Date: – –

ECU Shutdowns:

ITG HOST

File  Options  DataLogs  ComPorts  Phone  View  Help

Host Data:

ITG Unit ID: [ALPHA 00]
Mode Command: [NO CHANGE]
Power Command: [0] Percent

Current Time [07:41]
☐ Set Time [Tue 06-09-98]
ON Time
☐ Set Time
OFF Time
☐ Set Time
Report Time
☐ Hourly
☐ Set Time Report Phone Number:

DATA ONLY
ACCESS
(NO MODEM)

[Send >>>]

COM PORTS
Status:
COM1 OPEN
Checksum:
---
Errors:

NO
CARRIER

Industrial Turbo Generator Data

ITG Unit ID:
Keyswitch Posn:
Power Setpoint:        — kW
Contactor Status:
Utility Auth:
Mode:
Output Power:          — kW
Fault Code:
Current Time:
Current Date:

ECU Data:
Engine Speed:          — RPM
Compress In T:         — deg F
Recup Out T:           — deg F
Turbine Out T:         — deg F
Stator Temp:           — deg F
Bearing Air T:         — deg F
EncL Temp:             — deg F
Compress In P:         — psi
Air Filter P:          — psid

*FIG. 9(o)*

ITG HOST

File  Options  DataLogs  ComPorts  Phone  View  Help

Host Data:

ITG Unit ID: ALPHA 00
Mode Command: NO CHANGE
Power Command: 0 Percent

Current Time: 07:41
☐ Set Time: Tue 06-09-98

ON Time
☐ Set Time

OFF Time
☐ Set Time

Report Time
☐ Hourly
☐ Set Time

Report Phone Number:

DATA ONLY ACCESS
(NO MODEM)

[Send >>>]

COM PORTS
Status: COM1 OPEN
Checksum: ---
Errors:

NO CARRIER

Industrial Turbo Generator Data

ITG Unit ID: —
Keyswitch Posn: —
Power Setpoint: — — kW
Contactor Status: —
Utility Auth: —
Mode: —
Output Power: — — kW
Fault Code: —
Current Time: —
Current Date: —

Scheduled Events:
Power Setpoint — — kW
ON Time: —
ON Date: —
OFF Time: —
OFF Date: —
Report Time: —
Report Date: —
Report Mode: —
Phone #: —

*FIG. 9(p)*

ITG HOST

File  Options  DataLogs  ComPorts  Phone  View  Help

Host Data:

ITG Unit ID: ALPHA 00
Mode Command: NO CHANGE
Power Command: 0 Percent

Current Time: 07:41
☐ Set Time  Tue 06-09-98

ON Time
☐ Set Time

OFF Time
☐ Set Time

Report Time
☐ Hourly
☐ Set Time

Report Phone Number:

NO HOST TO TURBOGENERATOR COMMUNICATION

DATA ONLY ACCESS (NO MODEM)

Send >>>

COM PORTS
Status: COM1 OPEN
Checksum: ---
Errors:

NO CARRIER

Industrial Turbo Generator Data

ITG Unit ID: --
Keyswitch Posn: --
Power Setpoint: -- kW
Contactor Status: --
Utility Auth: --
Mode: --
Output Power: -- kW
Fault Code: --
Current Time: --
Current Date: --

Software Versions:
ITG Host: 2.32
Communications Processor: --
LPU DSP: --
LPU Microcontroller: --
ECU: --

FIG.9(r)

ITG HOST

File  Options  DataLogs  ComPorts  Phone  View  Help

Host Data:

ITG Unit ID: ALPHA 00
Mode Command: NO CHANGE
Power Command: 0 Percent

Current Time: 07:41
☐ Set Time: Tue 06-09-98

ON Time:
☐ Set Time:

OFF Time:
☐ Set Time:

Report Time:
☐ Hourly
☐ Set Time:

Report Phone Number:

NO HOST TO TURBOGENERATOR COMMUNICATION

DATA ONLY ACCESS (NO MODEM)

Send >>>

COM PORTS
Status: COM1 OPEN
Checksum: ---
Errors:
NO CARRIER

Industrial Turbo Generator Data

ITG Unit ID: - -
Keyswitch Posn: - -
Power Setpoint: - - kW
Contactor Status: - -
Utility Auth: - -
Mode: - -
Output Power: - - kW
Fault Code: - -
Current Time: - -
Current Date: - -

Faults:
NONE

*FIG. 9(s)*

ITG HOST

File  Options  DataLogs  ComPorts  Phone  View  Help

About ITG Host

Host Data:

ITG Unit ID: ALPHA 00

Mode Command: NO CHANGE

Power Command: 0 Percent

Current Time: 07:41
☐ Set Time    Tue 06-09-98

ON Time
☐ Set Time

OFF Time
☐ Set Time

Report Time
☐ Hourly
☐ Set Time

Report Phone Number:

NO HOST TO TURBOGENERATOR COMMUNICATION

DATA ONLY ACCESS (NO MODEM)

Send >>>

COM PORTS
Status: COM1 OPEN
Checksum: ---
Errors:

NO CARRIER

Generator Data

ITG Unit ID: —
Keyswitch Posn: —
Power Setpoint: — kW
Contactor Status: —
Utility Auth: —
Mode: —
Output Power: — kW
Fault Code: —
Current Time: —
Current Date: —

Voltage: — Volts DC
Current: — Amps DC
Speed: — RPM
Starter Speed: — RPM
C.P. #1 Temp: — Deg. F
C.P. #2 Temp: — Deg. F

*FIG.9(t)*

COMMUNICATIONS PROCESSOR REMOTE HOST AND MULTIPLE UNIT CONTROL DEVICES AND METHODS FOR MICROPOWER GENERATION SYSTEMS

BACKGROUND OF THE INVENTION

1. Field of the Invention

The field of this invention is communications hardware and software providing communications for a line power unit that controls the transformation of electrical power and supplies the transformed power to an electric utility grid. This invention also relates to remote hosting of such a line power unit as well as controlling multiple line power units connected in parallel to a grid.

2. Description of Related Art

Conventional small-scale power generation systems such as diesel back-up generators are typically controlled via manual switches provided on the front of a cabinet housing the electrical hardware. Furthermore, conventional back-up generators are typically stand-alone systems that individually connect to a local grid and/or a utility grid. During a power outage, an operator must physically manipulate the manual switches to start the engine and bring the system on-line to feed the grid. Although it is generally known to provide meters and other performance measuring devices on the equipment cabinet so that the operator can monitor the performance of the generator, the operator must still be physically present to perform such monitoring.

With the deregulation of the U.S. utility market and the increasing need for remotely located, small-scale electrical power generation systems in developing countries, there is an increasing need for a more versatile electrical generation system that is capable of remote control and monitoring. Because conventional back-up generator systems require an operator to be physically present, there exists a need for improving such conventional systems.

Furthermore, conventional systems also suffer from the lack of coordination between multiple generators, their monitoring and connection to the grid. There is also a need for a better interface permitting an operator to not only monitor the array of performance data relating to a line power unit that controls power transforming and feeding of the grid and the engine that drives the generator, but also to permit the operator to control the entire system utilizing a graphical user interface that rapidly communicates information to the operator and permits the operator to make decisions and control the system.

SUMMARY OF THE INVENTION

An object of the invention is to provide a line power unit with the ability to communicate data and control signals with a host computer. Another object of the invention is to provide separate processing and control of local display devices that unburdens the line power unit controller from these tasks. A further object of the present invention is to separately process input data, which also unburdens the line power unit controller from the chore of sampling such inputs and feeding them to an operator in an understandable format.

A further object of the present invention is to provide a remote host that may be located remotely from the electrical power source and line power unit.

A further object of the invention is to provide a intuitive graphical user interface that permits an operator to interface with the remote host and thereby monitor and control the line power unit and electrical power generation system in an efficient manner.

Yet another object to the present invention is to provide a structure for communicating and controlling multiple line power units and multiple electrical power generation systems.

The objects of the present invention are achieved by providing an I/O controller which is a control device that is separately provided from the line power unit controller. The I/O controller includes external interfaces such as serial ports and device drivers as well as a modem connection such that the I/O controller can communicate with data input devices; data output devices, the line power unit (LPU) controller and a remote host. The I/O controller also contains a processor and memory that can be programmed to perform initialization, clock processing, input processing, host message processing, LPU processing, lamp processing, and display processing.

The objects of the invention are further achieved by providing a remote host which is essentially a computer system remotely located from the I/O controller and connected thereto via modem or other communication devices. The remote host includes a graphical user interface that graphically displays the contents of LPU messages that contain performance data relating to the performance of the line power unit, engine and grid. The graphical user interface also provides the user with an intuitive method of controlling the line power unit and its related components from a location remote therefrom.

The objects of the invention are further achieved by providing a local bus structure that interconnects the line power unit controllers of multiple electrical power generation systems. In this way, a round-robin based method of polling each line power unit controller can be utilized to keep track of the performance of the power generation systems as well as provide a means of routing control messages to each of the line power units. In this way, multiple line power units connected in parallel to a grid can be efficiently monitored and controlled from a central location. This central location may be located either close to the power generation systems or remote therefrom by utilizing the techniques and structures disclosed herein.

By achieving these objects, the present invention provides a system of electrical power generation that is highly advantageous when compared with conventional systems. For example, the inventive electrical power generation system has particular advantages in providing back-up power as well as being a main power supply for a local grid. For hostile and relatively inaccessible locations, the present invention finds particular utility. For example, the remote monitoring and control of electrical power generation systems have key advantages that are readily apparent when the power generators are difficult to access. Furthermore, the high degree of data monitoring and control increases the efficiency, life span and safety of the system. The graphical user interface also reduces operator fatigue thereby increasing operator performance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention.

DETAILED DESCRIPTION OF THE PREFERRED EMBODIMENTS

Figure 1:
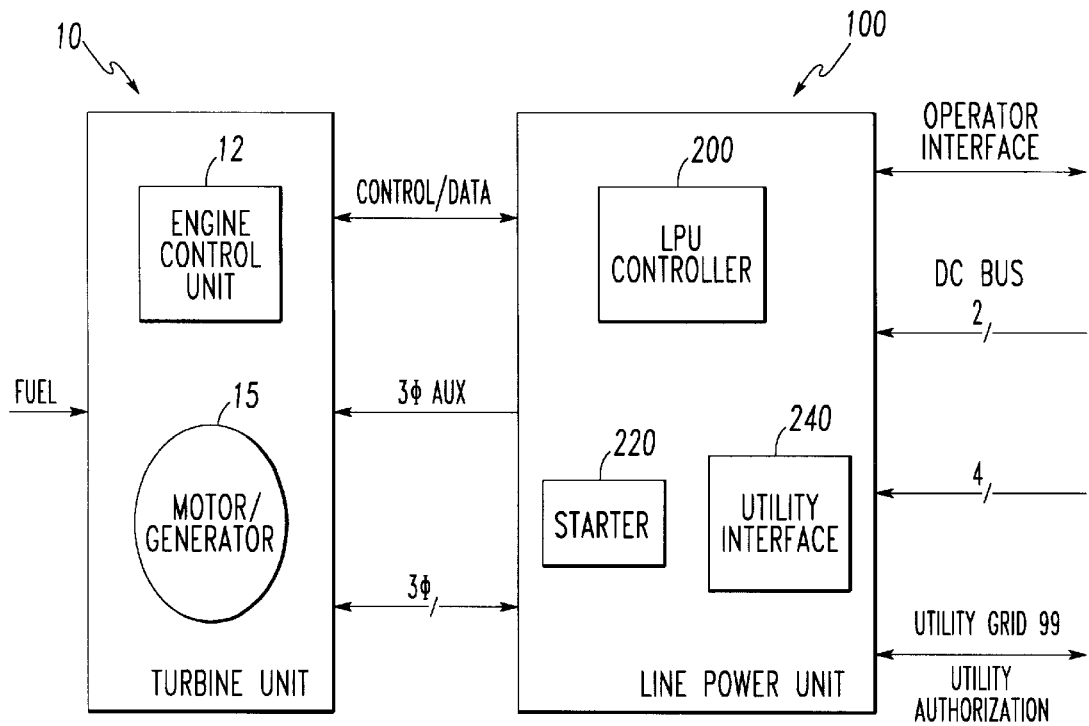
FIG. 1 is a high-level block diagram illustrating the major components of micro turbine generator system according to the invention.

FIG. 1 illustrates the major components of the inventive line power unit 100 and the overall relationship to a microturbine generator invention in which the invention may be incorporated. The microturbine generator system includes two major components: the turbine unit 10 and the line power unit 100 may be arranged as shown in FIG. 1.

The turbine unit 10 includes a motor/generator 15 and an engine control unit 12. The turbine unit 10 is supplied with fuel. For example, the motor/generator 15 may be constructed with an Allied Signal Turbo Generator™ which includes a turbine wheel, compressor, impeller and permanent magnet generator which are all mounted on a common shaft. This common shaft is supported by an air bearing which has a relatively high initial drag until a cushion of air is developed at which point the air bearing is nearly frictionless.

The motor (engine) in the motor/generator 15 is controlled by the engine control unit 12 which, for example, throttles the engine according to the demand placed upon the generator. Communication is provided between the turbine unit 10 and the line power unit 100 as shown by the control/data line connecting these units in FIG. 1. This data includes operating data such as turbine speed, temperature etc. as well as faults, status and turbine output.

The motor/generator 15 supplies three-phase (3φ) electrical power to the line power unit 100 as further shown in FIG. 1. The line power unit 100 also supplies three-phase auxiliary power (3φ Aux) to the turbine unit 10.

The line power unit 100 contains three basic components. The line power unit controller 200, starter 220 and utility interface 240 are all included within line power unit 100. Furthermore, an operator interface that permits an operator to monitor and control the line power unit is further provided. The operator interface may include a front panel display for displaying critical operating data as well as controls such as a shut down switch and power level command input as further described below.

A DC bus supplies DC power to the line power unit 100 to permit off-grid starting of the turbine unit. Furthermore, the utility interface 240 supplies three-phase electrical power to the utility grid 99 as well as an optional neutral line. The line power unit 100 also receives utility authorization from a utility company which authorizes connection to the grid 99.

Figure 3:
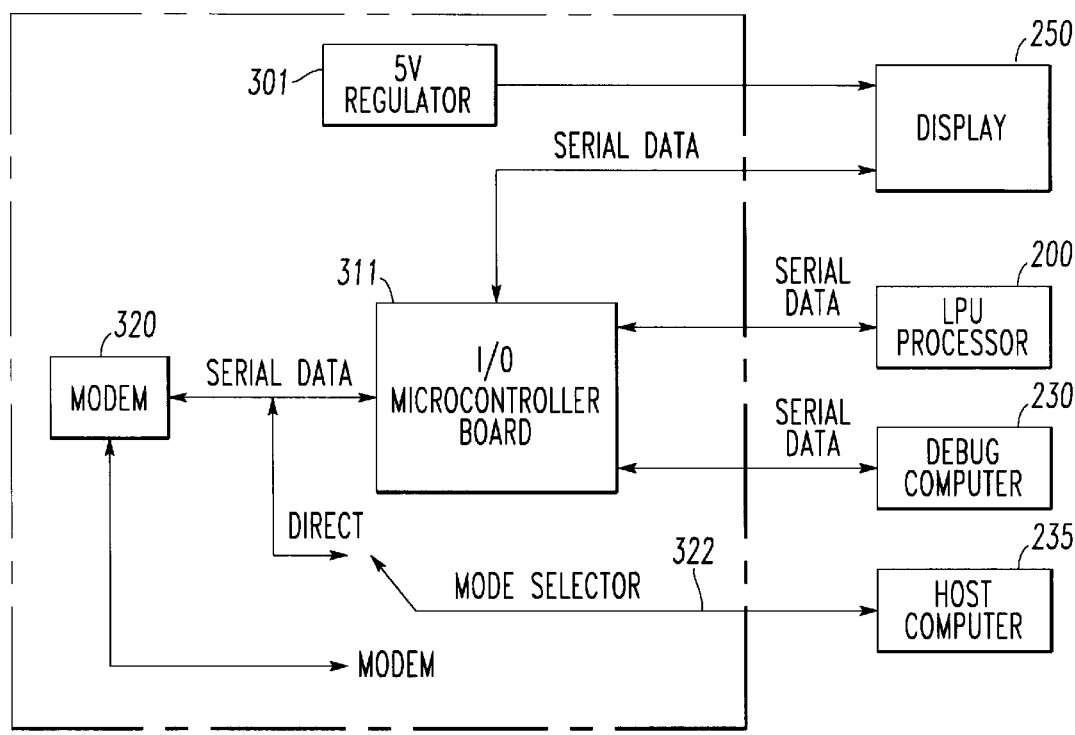
FIG. 3 is a high-level block diagram of the line power unit communication system according to the invention.
Figure 2:
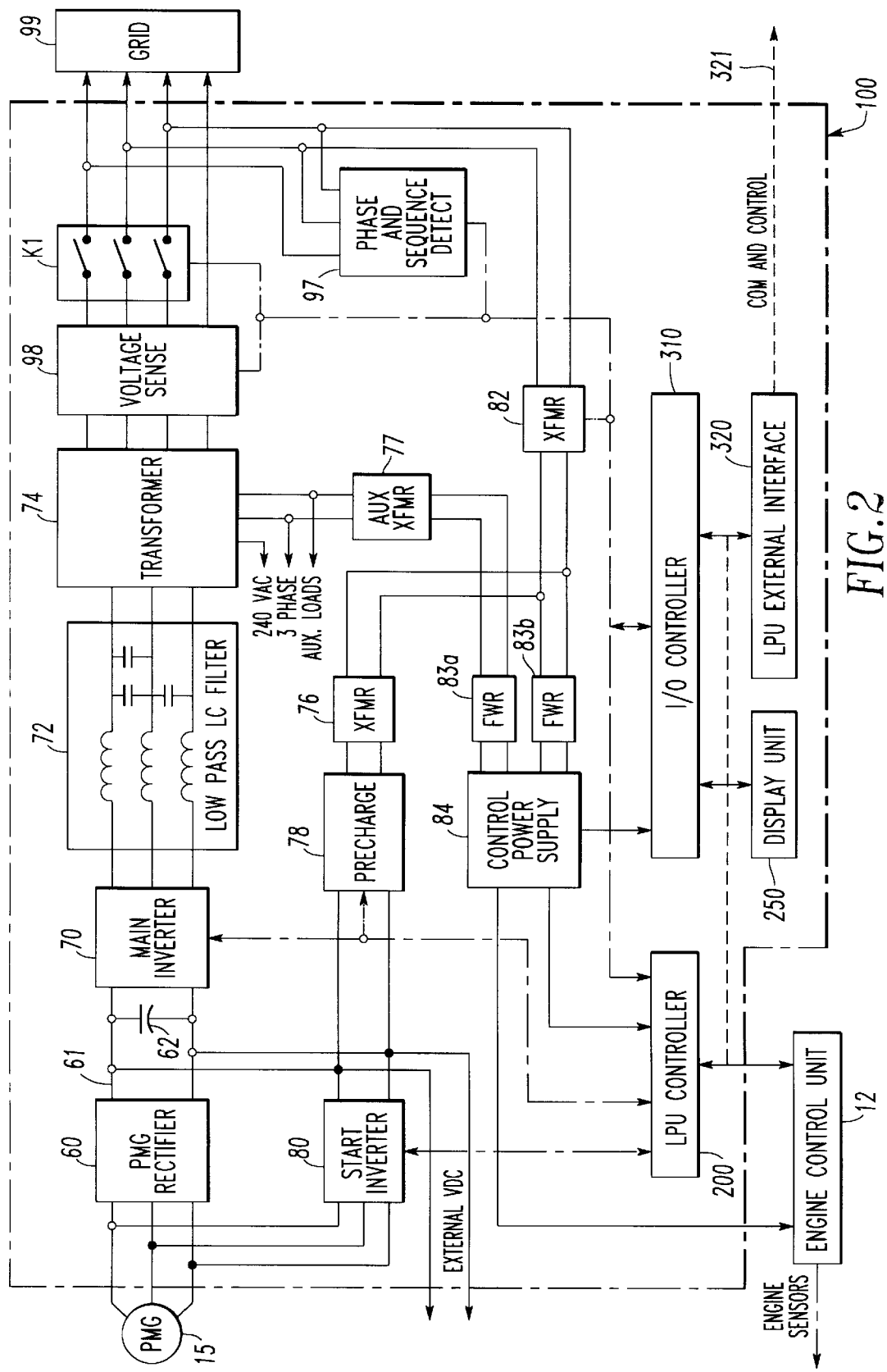
FIG. 2 is a detailed circuit diagram of a line power unit having an I/O controller and communications system according to the invention.
Figure 4:
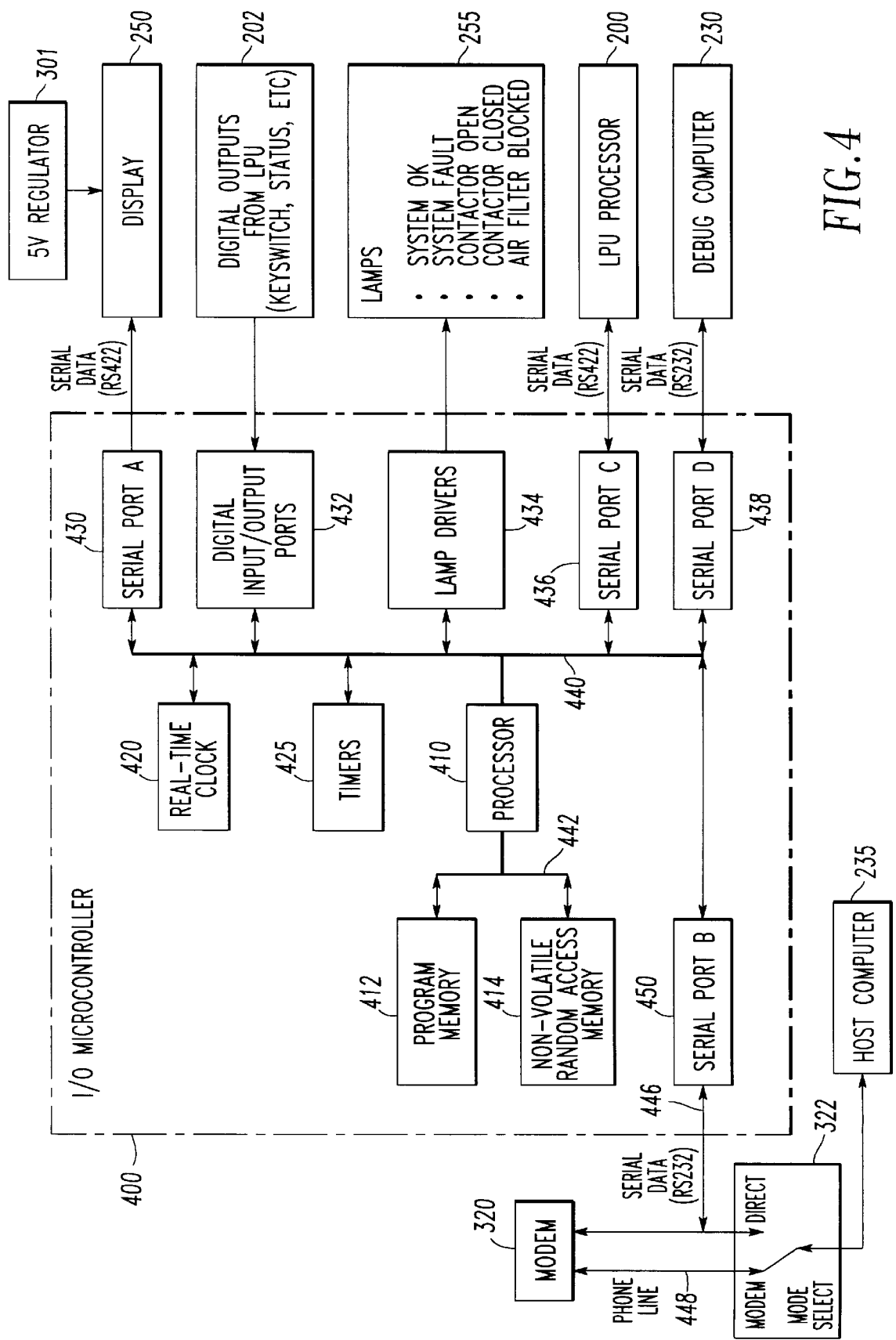
FIG. 4 is a detailed block diagram of the line power unit communication system according to the invention.

FIG. 2 shows the details of the inventive line power unit 100 and its connections to the permanent magnet generator 15, engine control unit 12 and utility grid 99. The starter unit 220 is generally comprised of start inverter 80, precharge circuit 78, transformer 76, and transformer 82. The utility interface generally includes the main inverter 70, low pass filter 72, transformer 74, voltage sensor 98, and contactor K1. The LPU controller 200 generally includes phase and sequence detector circuit 97, transformer 82, full wave rectifier 83b, full wave rectifier 83a, control power supply 84 and LPU controller 200. Correspondence between the general construction shown in FIG. 1 and the detailed embodiments shown in FIGS. 2–4 is not important. This description is merely for the purpose of orienting one of ordinary skill to the inventive system.

Turning to the details of the line power unit 100 construction, the permanent magnet generator 15 has all three phases connected to PMG rectifier 60. A DC bus 61 interconnects PMG rectifier 60 and main inverter 70. A capacitor 62 is connected across the DC bus 61 and thereby forms a DC link.

The output of the main inverter 70 is connected to transformer 74 via low pass LC filter 72. A voltage sense circuit 98 is connected to the output of the transformer 74 and supplies sensed voltages to the LPU controller 200 utilizing the data line shown.

A contactor K1 is controlled by LPU controller 200 via a control line as shown in FIG. 1 and provides a switchable connection between transformer 74 and the utility grid 99. A neutral line may be tapped from transformer 74 as further shown in FIG. 2 and connected to the grid 99.

A separate start inverter 80 is connected to the DC bus 61 and the external DC voltage supply which may be constructed with a battery. The start inverter 80 is also connected to the permanent magnet generator 15.

A precharge circuit 78 is connected to the grid via transformer 76 and transformer 82. Precharge circuit 78 is further connected to the DC bus 61. The precharge circuit 78 has a control input connected to a control data line that terminates at the LPU controller 200 as shown.

The line power unit 100 also supplies power to a local grid (e.g., 240 VAC three phase supplying auxiliary or local loads) via transformer 74. This local grid feeds local loads and the turbine unit including pumps and fans in the turbine unit.

An auxiliary transformer 77 is also connected to the output of the transformer 74. The output of the auxiliary transformer 77 is fed to full wave rectifier 83 to DC voltage to the control power supply 84. The control power supply 84 supplies power to the engine control unit 12 and the LPU controller 200 as well as the I/O controller 310.

The I/O controller 310 is connected via data lines to the LPU controller 200. The I/O controller 310 is further connected to the engine control unit 12, display unit 312, and LPU external interface 320. The LPU external interface 320 has a connection for communication and control via port 321.

The LPU controller 200 has control lines connected to the start inverter 80, main inverter 70, precharge circuit 78, transformer 82, and contactor K1. Furthermore, data is also provided to the LPU controller 200 via control/data lines from these same elements as well as the phase and sequence detector 97 that is connected at the output of contactor K1. The LPU controller 200 also communicates data and control signals to the engine control unit 12.

The engine control unit is supplied power from the control power supply 84 and communicates with engine sensors as shown.

Although FIG. 2 illustrates the preferred line power unit 100 having the communications hardware (310, 250, 320) according to the invention, it is to be understood that a variety of other line power units and electrical power sources may be improved with the techniques and hardware disclosed in this application. In other words, the invention is not restricted to the line power unit 100 shown in FIGS. 1 and 2 and may use other line power units that permit a command to be sent to a line power unit controller and which gathers performance data indicating performance of the engine, generator, and/or line power unit components. Examples of other such line power units are disclosed in related co-pending application No., 1215-0371P which is hereby incorporated by reference.

Furthermore, such line power units may be supplied power from a variety of electrical power sources such as windmills, fuel cells and generators driven by mechanical, chemical, or nuclear processes.

The I/O controller 310, display unit 250 and LPU external interface 320 shown in FIG. 2 may also have the construction shown in FIG. 3. The I/O controller 310 or 311 is preferably constructed with a microcontroller board mounted internally within the equipment cabinet that houses the line power unit 100.

The display unit 250 is a display mounted to the front panel of the equipment cabinet. This display 250 preferably includes various indicator lamps and a scrolling alpha-numeric display. The scrolling alpha-numeric display was chosen because it is a relatively inexpensive device having high reliability and low power requirements. Of course, other types of displays such as a LCD panel or CRT may be utilized but these devices are not preferred because of their relative fragility, higher price and unnecessary complexity.

The equipment cabinet may be placed in a relatively hostile environment thereby requiring relatively hardy components, which are fulfilled by lamps and a rugged alpha-numeric display 250. This display 250 may be reduced in size and cost by utilizing a one-line display that scrolls to display all the desired information.

Continuing with the locations of the components, the LPU external interface 320 generally corresponds to the modem 320 shown in FIG. 3 but may also include other ports as shown in FIG. 4 as described below. The LPU external interface 320 is preferably located inside of the equipment cabinet for protection from the environment.

The communications hardware shown in FIG. 3 has the following construction. An I/O microcontroller board 311 is mounted within the cabinet and contains serial data lines connected thereto. A first serial data line is connected to the I/O microcontroller board 311 and provides a data path for the display 250. Because the display 250 may include lamps, a 5-volt regulator 301 is provided to drive such lamps in display 250.

A second serial data line connects the I/O microcontroller board 311 with the LPU processor 200. In this way, various performance data gathered by the LPU controller 200 may be sent to the I/O microcontroller board 311. Similarly, this second serial data line permits the I/O microcontroller board 311 to route commands to the LPU processor 200.

A third serial data line connects the I/O microcontroller board 311 with a debug computer 230. The de-bug computer 230 is a local computing device that permits an operator to perform de-bugging of the software and/or hardware within the I/O microcontroller board 311. The de-bug computer 230 may also access the LPU processor 200 via the serial data lines connecting the de-bug computer 230 to the I/O microcontroller board 311 and connecting the I/O microcontroller board 311 to the LPU processor 200. In this way, de-bugging of the LPU processor 200 and the software loaded therein may also be performed by the de-bug computer 230.

A fourth serial data line connects the I/O microcontroller board 311 to modem 320 and to a direct connect port. A mode selector 322 selects between a direct mode in which data is directly routed to and from the I/O microcontroller board 311 and a host computer 235 connected to the mode selector 322. The mode selector 322 selects the mode based on a signal from host computer 235 or a manual switch provided directly on the mode selector 322. Other types of methods and devices for providing this mode selection via mode selector 322 are also contemplated by this invention.

Alternatively, the I/O microcontroller board 311 can communicate to a host computer 235 via the modem 320. In other words, the mode selector 322 can select the modem port, which permits the I/O microcontroller board 311 to exchange data via modem 320 with a host computer 235. In this way, the host computer 235 may be a remote host that is connected to the I/O microcontroller board 311 via a modem or a local host connected via a direct connection. The term host computer 235 is a general term that encompasses a truly remote host connected via modem or a local host that is directly connected to the I/O microcontroller board 311 as described above.

FIG. 4 shows further details for implementing the communication system according to the invention. Because there is no direct correspondence between the components of the communication system shown in FIGS. 2 and 3, some of the components have been re-labeled with different reference numerals. Corresponding components are labeled with the same reference numerals.

As shown in FIG. 4, the I/O microcontroller 400 includes a processor 410 which may be constructed with a known microprocessor that is commercially available. The processor 410 is connected to timers 425 and a real-time clock 420 via bus 440. The timers 425 are individually programmable time keeping devices, the operation of which is further described below. The real-time clock 420 is a time keeping device that keeps track of the actual or real time.

The bus 440 includes several external communication ports including serial port A 430, digital input/output ports 432, serial port C 436 and serial port D 438. Additional ports, either serial or parallel may also be connected to bus 440 providing expansion for future modifications. In other words, bus 440 is preferably an open architecture that permits expansion.

Serial port A 430 is connected via a serial data line such as an RS 422 data line to display 250. As mentioned above, the display 250 is preferably constructed with a scrolling alpha-numeric display device. Display 250 also includes indicating devices such as indicator lamps that are regulated by 5-volt regulator 301, connected thereto.

The digital input/output ports 432 receive digital outputs from line power unit controller 200 and from front panel switches located on the front panel of the equipment cabinet. The front switches include a key switch which is a master switch operated by a key, thereby providing security for the access and control of the line power unit 100 as well as other manual switches such as an emergency shut-down switch. Performance and/or status data gathered by the LPU controller 200 are also sent to the I/O microcontroller board 400 via digital outputs 202, digital input/output port 432 and bus 440. The system status and performance data include such data as utility grid voltage, loss of phase, grid frequency, DC bus voltage, line power unit operational mode, etc.

The following table illustrates examples of such status and performance data:

TABLE 1

5V Inputs
   Manual Start Indication
   Auto Start Indication
   Open Contactor Indication
   Emergency Stop Indication
   Utility Authorization Indication
   Gnd Fault Indication
   Phase OK Indication
12V Inputs
   System OK Lamp
   Emergency Stop
   Power Output Contactor Open Lamp
   Power Output Contactor Closed Lamp
   Delta P Air Filter Lamp Further details of the data gathering functions performed by the LPU controller 200 are described in related application No. 1215-0381P which is hereby incorporated by reference.

The LPU processor 200 also communicates with the I/O processor 410 via serial port C 436 and bus 440. In this way, other data such as command data may be sent from the I/O microcontroller 400 to LPU processor 200. Such data may include a power level command that is routed to the LPU processor 200 that commands the LPU processor 200 to control the line power unit 100 to deliver the requested power level.

The data may further include a start engine command, a pre-charge initiate command, an inverter enable command, an inverter disable command, a contactor K1 control command, an emergency stop command, utility authorization data, a shutdown command, and a restart command.

The de-bug computer 230 is connected to serial port D 438 and to processor 210 via bus 440 connected to serial port D 438. In this way, the debug computer 230 may communicate with the processor 410 to perform the debugging operations described above.

The bus 440 has a further connection to serial port B 450 that is connected to another serial data line that may be implemented with an RS 232 data protocol. This serial data line 446 is connected to a modem 460 and to a mode selector 322. The mode selector 322 contains a direct connection and a modem connection to a host computer 235. Thus, the mode selector 322 can provide either a direct connection or a modem connection to host computer 235.

The processor 410 includes a second bus 442 that provides a connection to program memory 412 and to non-volatile random access memory (RAM) 414. The program memory 412 may also be resident in a ROM, EEPROM or PROM chip in which the inventive programs are semi-permanently or permanently stored. Alternatively, the program memory 412 may include a floppy disc or other mass storage medium that supplies the inventive programs to the RAM 414. The onboard ROM or EEPROM chip is preferred because changes to the program are relatively infrequent and such volatile mass storage media is subject to erasure, or other modification.

By loading the program from program memory 412 into the random access memory 414 and by thereafter executing this program via processor 410, the I/O microcontroller 400 is transformed into a specially programmed machine, executing the inventive methodology. This inventive methodology is further described in relation to FIGS. 7–8(g) below.

Figure 5:
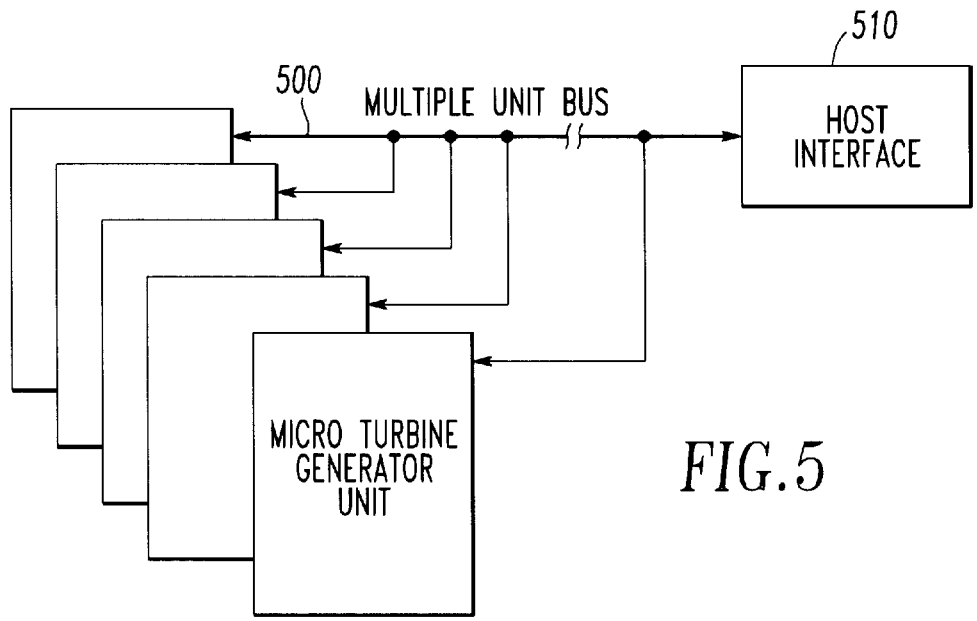
FIG. 5 is a high-level block diagram illustrating a multiple unit bus structure and operator interface for multiple micro turbine generators.

A system of multiple microgenerators may also be constructed according to the invention. Each microgenerator may be constructed with the details shown in FIG. 2. By connecting a plurality of line power units 100, each being driven by a permanent magnet generator 15, to a multiple unit bus 500 as shown in FIG. 5 coordinated dated monitoring and control can be achieved. More particularly, the multiple unit bus 500 interconnects all of the I/O controllers 310/400, thereby providing a data and command path to a host interface 510 as shown in FIG. 5.

Figure 6:
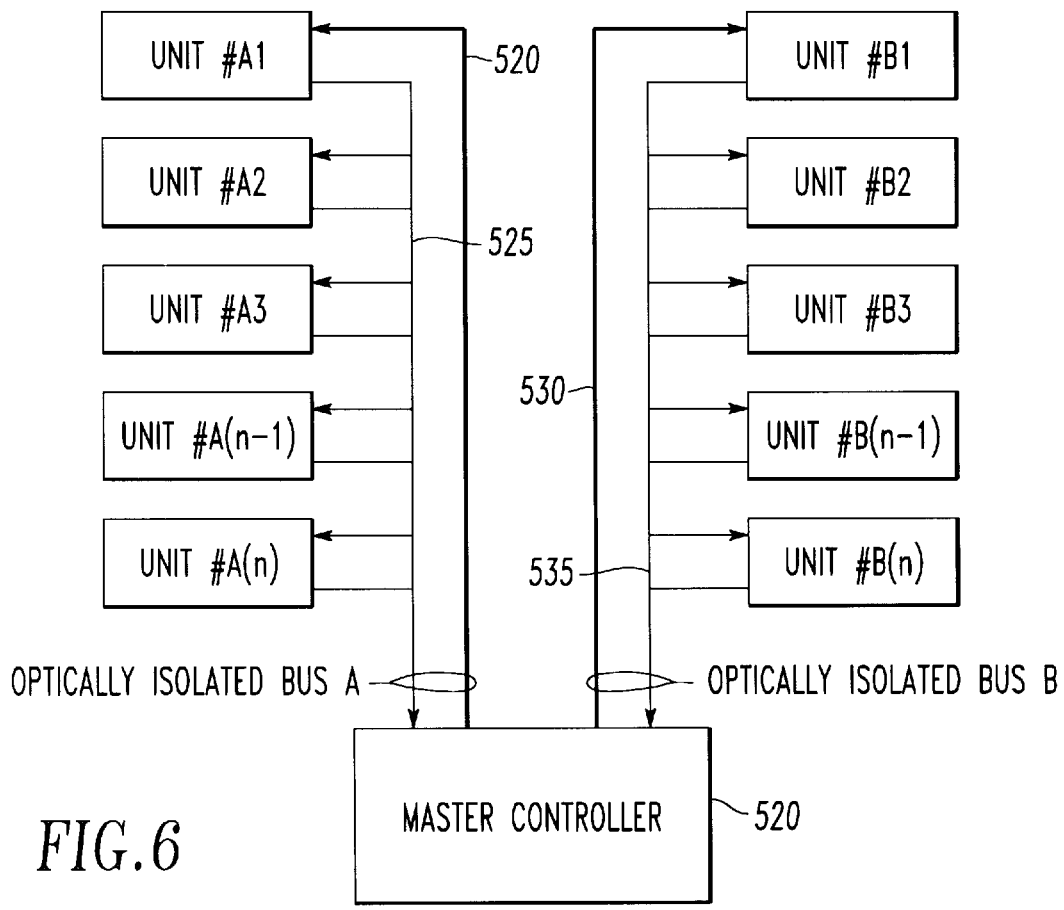
FIG. 6 is a detailed block diagram illustrating multiple unit control bus structure for permitting a master controller to control multiple line power units.

FIG. 6 illustrates further details of multiple unit control according to the invention. A master controller 520, which may be implemented with a personal computer, is located relatively close to each of the units #A1–#B(n). Each of these units #A1–#B(n) may be constructed with the line power unit 100 and related components shown in FIG. 2. The communication and control port 321 shown in FIG. 2 may be constructed with a separate input and output line. Using such separate input and output lines for the communication and control port 321, one may construct the multiple unit bus structure shown in FIG. 6.

The heart of the multiple unit control is the dedicated serial bus. Such a dedicated serial bus necessarily requires that all of the microturbine generator units be in close proximity. Such a dedicated serial bus structure permits rapid polling of the generator units on a round-robin basis. In this way, each of the generator units can be monitored and controlled in a centralized fashion and on a real-time basis.

As further shown in FIG. 6, the dedicated serial bus may actually include two or more busses A, B. FIG. 6 illustrates two busses A, B including optically isolated bus A and optically isolated bus B. Each of the busses A, B is optically isolated from the master controller 520.

The busses A, B may be constructed with optically isolated, four wire serial busses utilizing an RS 485 format or equivalent. If the RS 485 format is utilized, a total of 64 units can be directly connected on each bus A, B. Multiple busses such as busses A, B shown in FIG. 6 may be connected to the same master controller 520, thereby supporting a larger number of units.

As mentioned above, each of the units must be located in close proximity to each other and to master controller 520. One reason for this proximity is that the maximum length for each 64-unit bus A, B (utilizing the RS 485 rules) is 4000 feet. Of course, other signal formats may be utilized which could increase the acceptable proximity area.

As further shown in FIG. 6, optically isolated bus A includes a data output 520 that transmits command data to each of the units #A1–#A(n). Furthermore, the optically isolated bus A includes data input line 525 that transmits data such as performance data from the units #A1–#A(n) to the master controller 520. A similar structure for optically isolated bus B including data output 530 and data input 535 is provided. Similar structures can be provided for other optically isolated busses connected to the master controller 520.

The busses A, B are dedicated specifically to the monitoring and control of power level and power factor for each of the units. In this way, the master controller 520 can not only monitor the performance of each of the units but also can control power output, power factor, connection to the grid, etc. of each of the units in an individual fashion.

One of the advantages of the high speed serial bus structure A, B is that control and monitoring of the power generation units #A1–#B(n) can be accomplished in a nearly real-time manner. Because of the large potential for serious damage due to the power levels handled by each of the power generation units #A1–#B(n), such precise and rapid control of each unit is a necessity. Assuming that a maximum number of 64 units are attached to bus A, the maximum update rate will be once per second per unit at a baud rate of 19.2 k-baud. This further assumes a 10-byte message and a 10-byte reply for each unit in a round-robin polling.

The multiple unit control structure utilizes a round-robin polling methodology. Taking bus A as an example, this methodology polls each of the units #A1–#A(n) on a round-robin basis. This is accomplished with a command message and reply message structure in which the master controller 520 sends a message to each of the units #A1–#A(n) on optically isolated bus A. Each of the units #A1–#A(n) then replies with a reply message to the master controller 520. These output messages are sent on a round-robin basis and the master controller 520 expects a reply message in response thereto.

To coordinate message sending and receiving, each unit #A1–#A(n) is assigned a unique address or ID and will only reply to messages which contain the assigned ID. The command message from the master controller 520 includes the destination ID, the source ID, a message counter, the power command, the power factor command and message integrity bytes. The reply message from the addressed unit will include the destination ID, the source ID, a message counter, the current power level, power factor and message integrity bytes. By utilizing such command and reply messages, the master controller 520 can keep track of each unit's performance and thereby appropriately control each unit on a round-robin basis.

Assuming a 10-byte command message and 10-byte reply message for each unit with the round-robin polling method, the system can have a maximum update rate of once per second per unit at a baud rate of 19.2 K-baud. This assumes the maximum number of 64 units attached to each bus. Of course, higher byte rates and fewer units attached to each bus will increase the maximum update rate.

One of the advantages of multiple unit control is that it provides a means to command the power that each unit will deliver. Such a scheme will allow for the entire network of units to compensate for one or several weak units. Weak units are limited for some reason from delivering full power to the grid. For example, an under-performing or malfunctioning unit can be compensated by the master controller 520. Furthermore, the master controller 520 cannot only compensate for under-performing units, but can also take malfunctioning units off-line. This provides a graceful degradation of the network of units, extending the operating time between required maintenance events.

Alternatives to the multiple unit control shown in FIGS. 5 and 6 include redundant master controllers 520. The general requirement of continued reliability and robustness for power generation systems makes providing the multiple unit control system disclosed herein even further advantageous if a secondary or back-up master controller 520' is provided in parallel with master controller 520. In this way, back-up master controller 520' can take over or provide a checking operation for the primary master controller 520.

By utilizing the destination ID and the message counter, the master controller 520 can determine whether each unit has responded with a reply message to the corresponding command message. In other words, the reply message will contain the same message counter number as the corresponding command message. Thus, the master controller 520 can correlate the command messages with the reply messages. This further permits the master controller 520 to determine whether each unit has appropriately responded and is performing the command sent thereto.

The master controller 250 may also favor one or more of the units #A1–#A(n) during the round robin polling such that one or more of the units #A1–#A(n) are polled a greater number of times than the remaining units during the round robbin. This alternative is particularly useful for a troublesome unit that is not performing as desired or otherwise needs special attention.

Furthermore, the remote host 235 may be connected to the master controller 520 by providing the master controller 520 with the communications hardware disclosed herein. In this way, the master controller 520 can be controlled remotely via remote host 235.

Although it is possible to utilize an interrupt scheme to send and receive messages between the master controller 520 and the units #A1–#B(n), such an interrupt scheme is not preferred. The master controller 520 must be made constantly aware of the status and performance of each of the units connected thereto. An interrupt scheme will not provide the master controller 520 with such a constant awareness of conditions. In contrast, the preferred round-robin polling method does ensure a nearly constant awareness of the unit's performance, at least within the limits of the maximum update rate.

In this regard, one of the inventive aspects is to keep the size of the command and reply messages as small as possible. In this way, the command and reply messages will not consume bandwidth on the bus and thereby degrade the maximum up-date rate. Thus, the command message contains only that information which is necessary to control each of the units, such as the unit ID, power level, power factor and check bytes. Similarly, the reply message is also as short as possible and only needs to include the destination ID, source ID, message counter, current power level, current power factor and message integrity bytes.

If power factor control is not a capability of each of the units #A1–#B(n), then this data may be excluded from the messages. The capabilities that must be included in each of the line power units 100, is the capability of controlling the power output to the grid and the capability to connect and disconnect from the grid 99. Furthermore, the capability to detect the power actually output to the grid as well as other critical data should also be detected by each of the units and relayed to the master controller 520.

Furthermore, the master controller 520 and serial data bus structure shown in FIGS. 5 and 6 coordinates with the communication hardware described above in relation to FIGS. 3 and 4. In other words, each of the units #A1–#B(n) is advantageously provided with the communications hardware shown in FIGS. 3 and 4. In this regard, the master controller 520 replaces the host computer 235 via a direct serial connection on a bus such as bus A shown in FIG. 6.

Operation of the Communications Hardware

Figure 7:
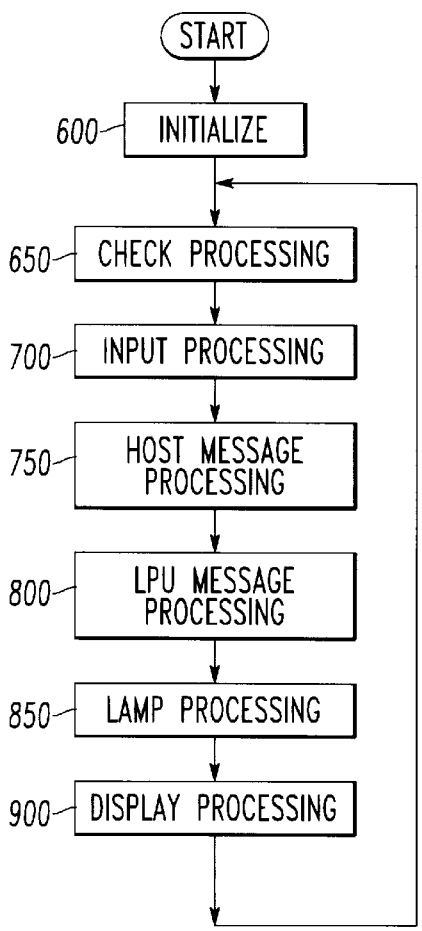
FIG. 7 is a high-level flow diagram illustrating the high-level operations performed by the inventive I/O controller.

FIG. 7 illustrates the major steps performed by the processor 410 in the I/O microcontroller 400 to process communications. The process as illustrated by FIG. 7 may also be implemented by the I/O controller 310 shown in FIG. 2 or the I/O microcontroller board 311 shown in FIG. 3.

Communications processing begins, as shown in FIG. 7, with initialization step 600. Then, a loop is formed in which the following steps are performed. First, the processor 410 performs clock processing 650 which is generally a process for determining whether the time for scheduled events has arrived. Thereafter, the input processing step 700 is performed. The processor 410 then proceeds with host message processing step 750, LPU message processing step 800, lamp processing step 850 and display processing step 900.

By executing these steps, various messages from the host computer 235 and the line power unit 100 may be processed by the communications hardware. The results of these messages may affect the display outputs which is performed by the lamp processing step 850 and the display processing step 900. Details of each of these steps is shown in FIGS. 8(a)–(g) and further described below.

Figure 8A:
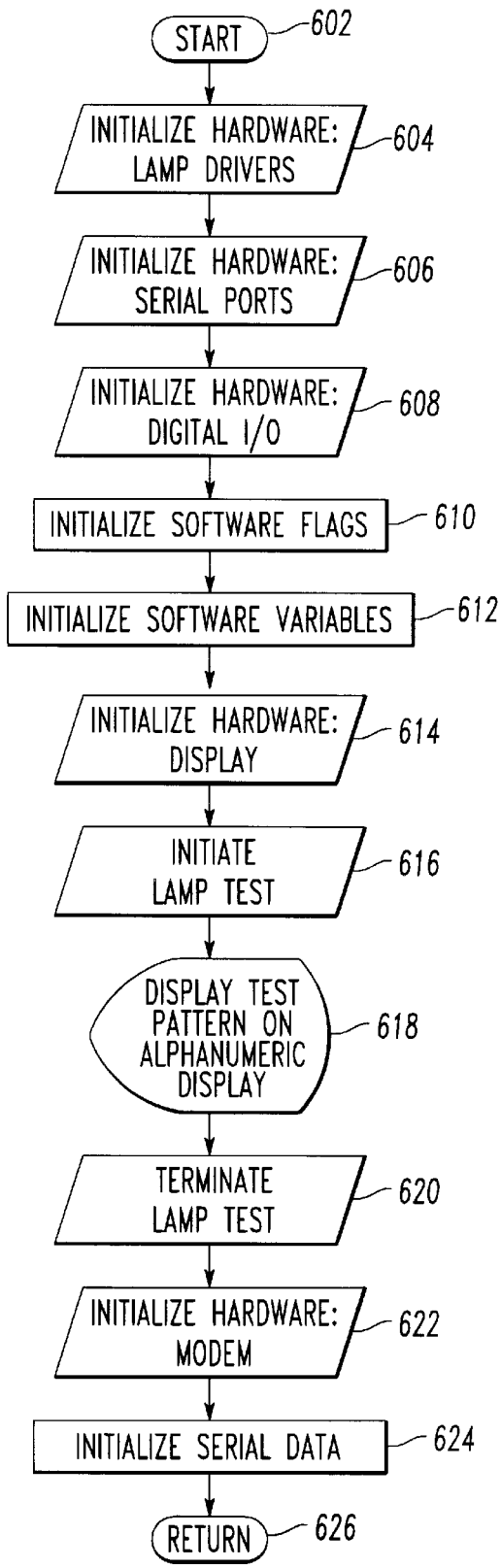
FIGS. 8(a)–(g) are low-level flow diagrams illustrating the details of the high-level functions performed by the I/O controller according to the invention.

As shown in FIG. 8(a), the initialization step 600 begins at start step 602 and then proceeds to the lamp driver initialization step 605. In this way, the lamp drivers 434 that drive the lamps on the front panel display 250 may be initialized. The initial lamp state may include, for example, a system "OK" status lamp "ON", contactor-open indicating lamp "ON", etc. which may be tailored to the particular initialization step desired by the operator. In other words, the initialization state is a state having specific lamp outputs generally indicating a safe, ready-to-operate initialized state as variously indicated by the lamps on the front panel display 250.

After the lamp drivers 434 are initialized by initialized lamp driver step 604, the process then proceeds to initialize the serial ports in step 606. The serial ports initialized by step 606 include serial port A 430, serial port B 450, serial port C 436 and serial port D 438 on the I/O microcontroller 400. This initialization step 606 brings each of the serial port into an operational state.

Thereafter, the digital input/output port 432 is initialized by step 608. This permits the I/O microcontroller 400 to receive digital data from the line power unit 100 such as key switch data, status information, etc.

Then, the process proceeds by initializing all software flags. As in many computer programs, this inventive program contains a variety of flags which are essentially data bits indicating the status of various parameters utilized by the program. Step 610 initializes the software flags into a predetermined and predictable initialized state.

Then, the process initializes the display 250 in initialize display step 614. This brings the alpha-numeric display 250 on the front panel of the cabinet into an initialized state. For example, an initialization message such as "system initializing", "please wait" or "system ready", and "initialized" or other initialization state indicating message may be generated after the display 250 is initialized by initialize display step 614.

Thereafter, the processor 410 initiates a lamp test which tests all of the lamps in the display 250 by, for example, simultaneously turning all of the lamps on. In this way, an operator can be assured that none of the lamps are burned out and all of them are operational.

Then, the processor 410 continues the initialization by proceeding to display a test pattern on the alpha-numeric display 250 in step 618. In other words, step 618 displays some sort of initial test pattern that tests all of the individual display elements on the display 250. A sequence of asterisks or other display character that illuminates all of the individual display elements is preferable because it permits the operator to simultaneously view all of the display elements and verify that they are operational.

Then, the lamp test is terminated in step 620. Preferably, there is a delay time between the initiation of the lamp test in step 616 and the termination of the lamp test in step 620. This provides the operator time in which to verify that the lamps do indeed operate as intended.

After the lamps are fully tested, the system then proceeds by initializing the modem 460 by executing the initialize modem step 622. This initialized modem step 622 may proceed, for example, by sending a modem initialization code to the modem 460 via bus 440 and serial port 450. The modem 460 will typically respond with data indicating modem status. Thereafter, the initialized serial data step 624 initializes serial data by setting up program variables in memory such as how many characters are in the command and response messages.

After performing initialization in step 600, the method proceeds to step 650 which is a clock processing step.

Figure 8B:
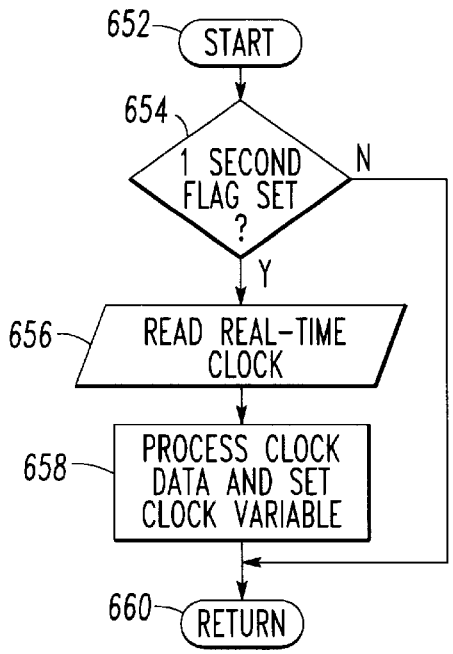
Figure 8E:
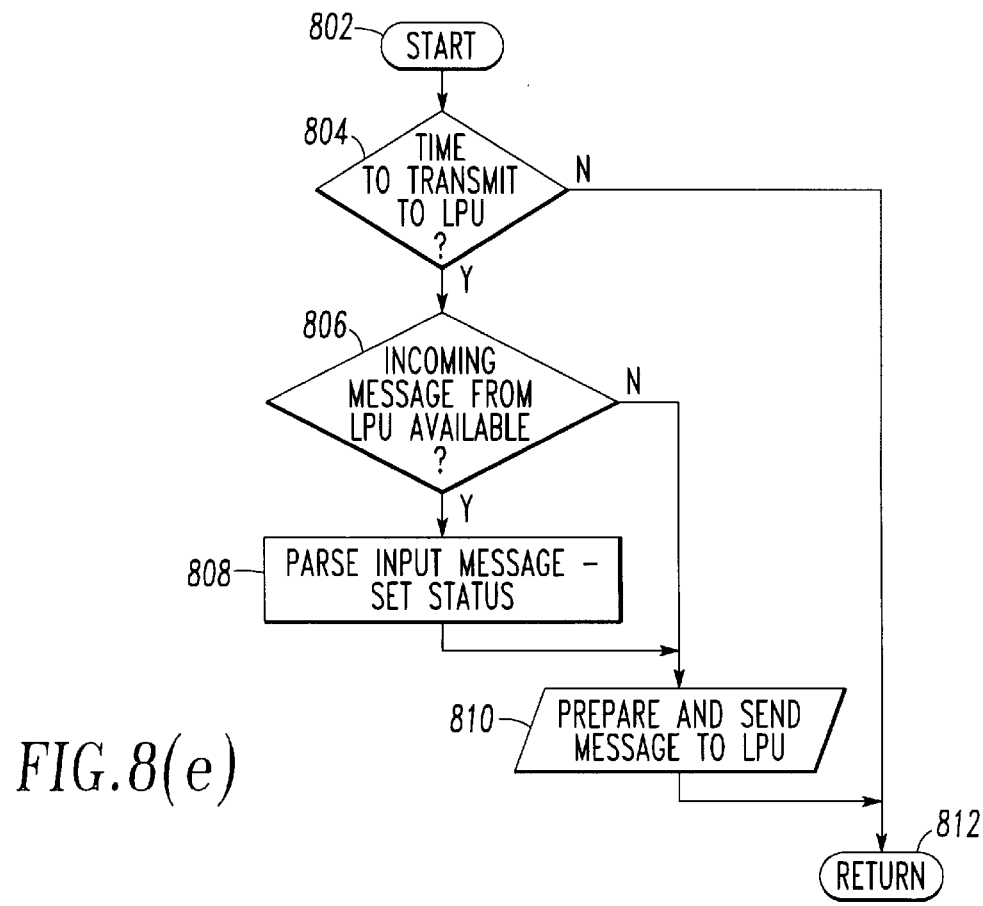

The details of the clock processing step are shown in FIG. 8(b) and begin with start step 652 and then proceed to decision step 654. Decision step 654 only permits the clock processing step 650 to be performed upon even second intervals. In other words, the clock which drives processor 410 operates at a frequency higher than once per second. The schedules of events maintained by the I/O processor 410 need only trigger the initiation of scheduled events every second. Step 654 merely determines whether the 1 second flag has been set wherein the 1 second flag keeps track of when the real time clock indicates that a whole second has arrived. If the 1 second flag has not been set, then the 1 second flag decision step 654 skips over the remainder of the clock processing by jumping to return step 660 which returns the flow to input processing step 700.

If, on the other hand, the 1 second flag set decision step 654 as shown in FIG. 7 determines that the 1 second flag has indeed been set, then step 656 reads the real time clock 420 as a reference for step 658. This real time clock data is then utilized by processing step 658 to compare the real time clock 420 against scheduled events which are stored in a set clock variable data area or in timers 425. Such scheduled events may, for example, include turning on the line power unit 100 or demanding a predetermined power level at a scheduled time. Step 658 determines whether this scheduled event time has arrived by comparing the scheduled event time stored in the set clock variable against the real time clock data read by step 656.

Figure 8C:
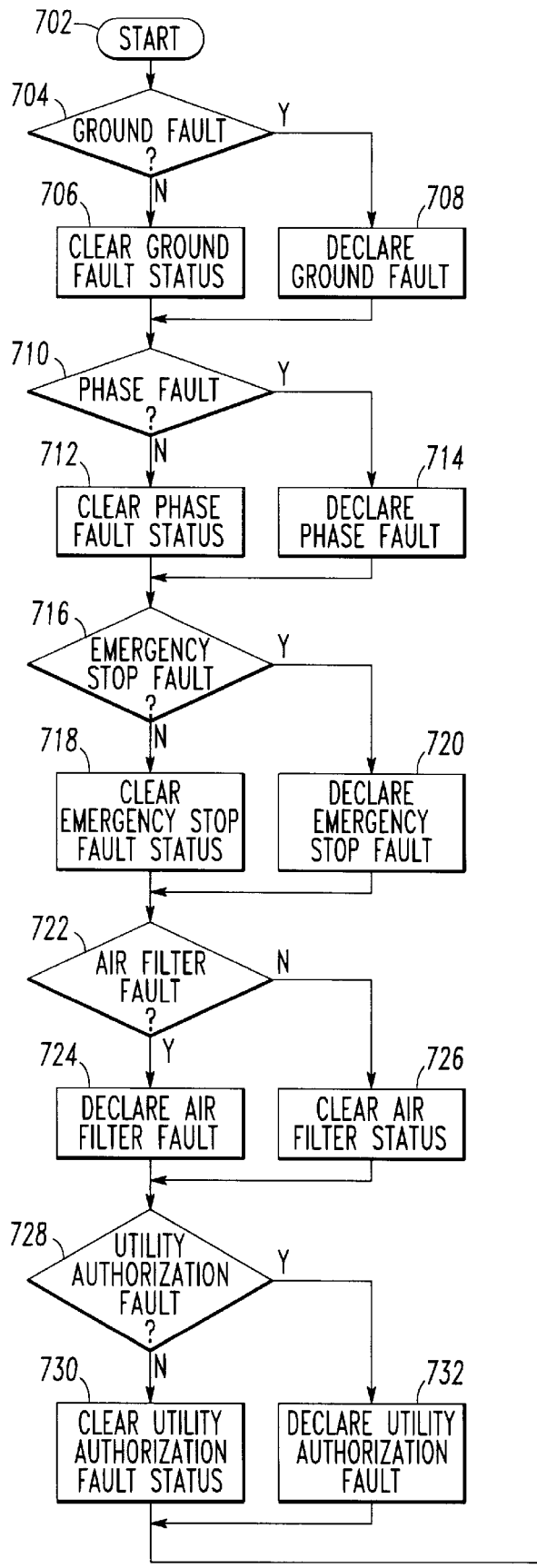
Figure 8C:
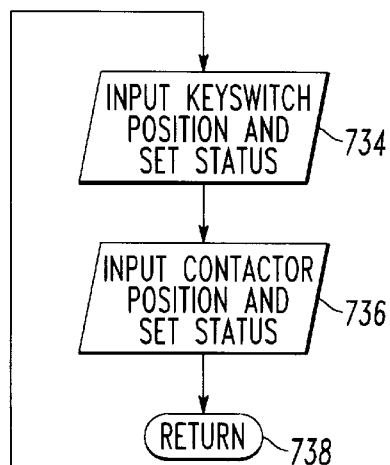
Figure 8D:
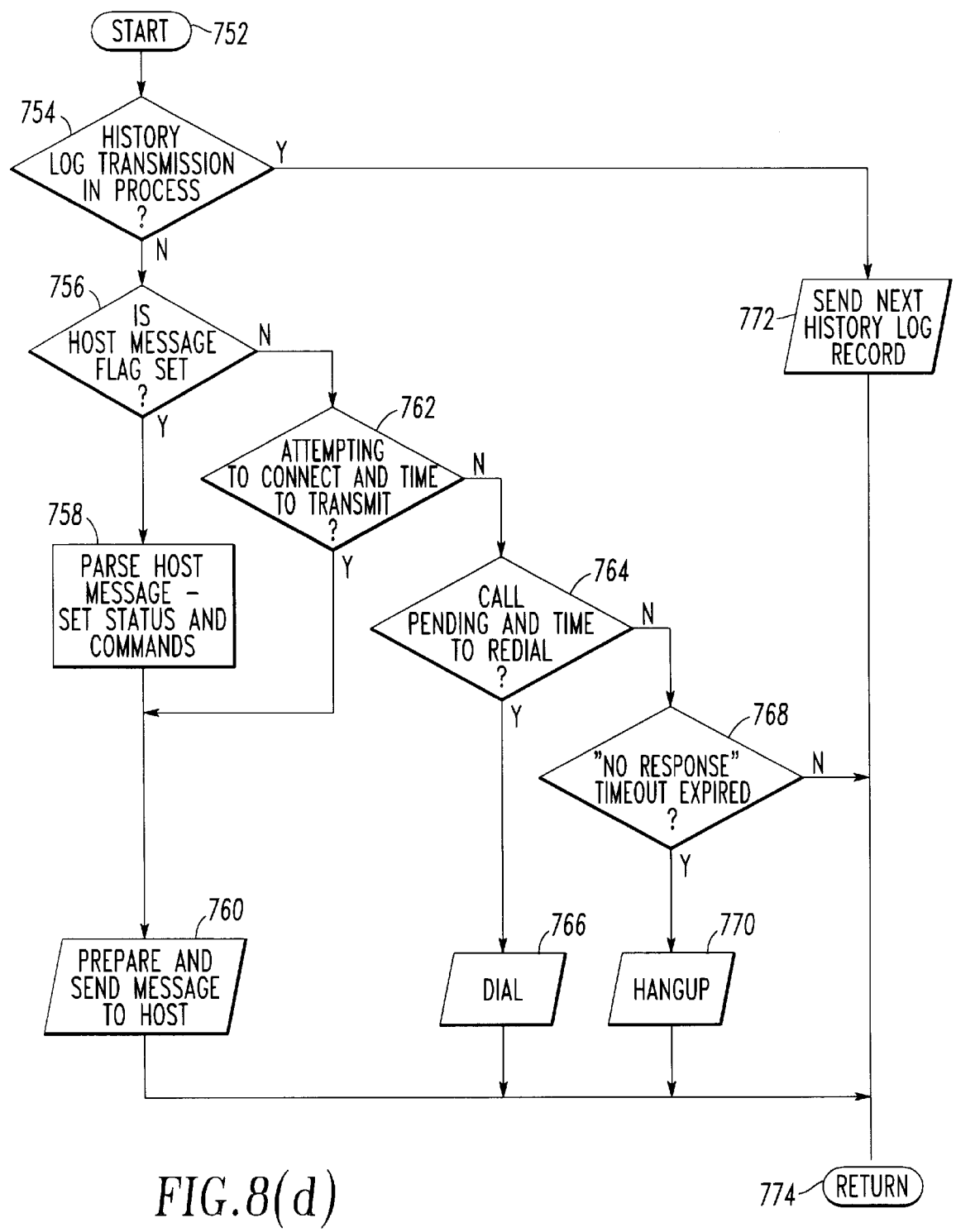
Figure 8F:
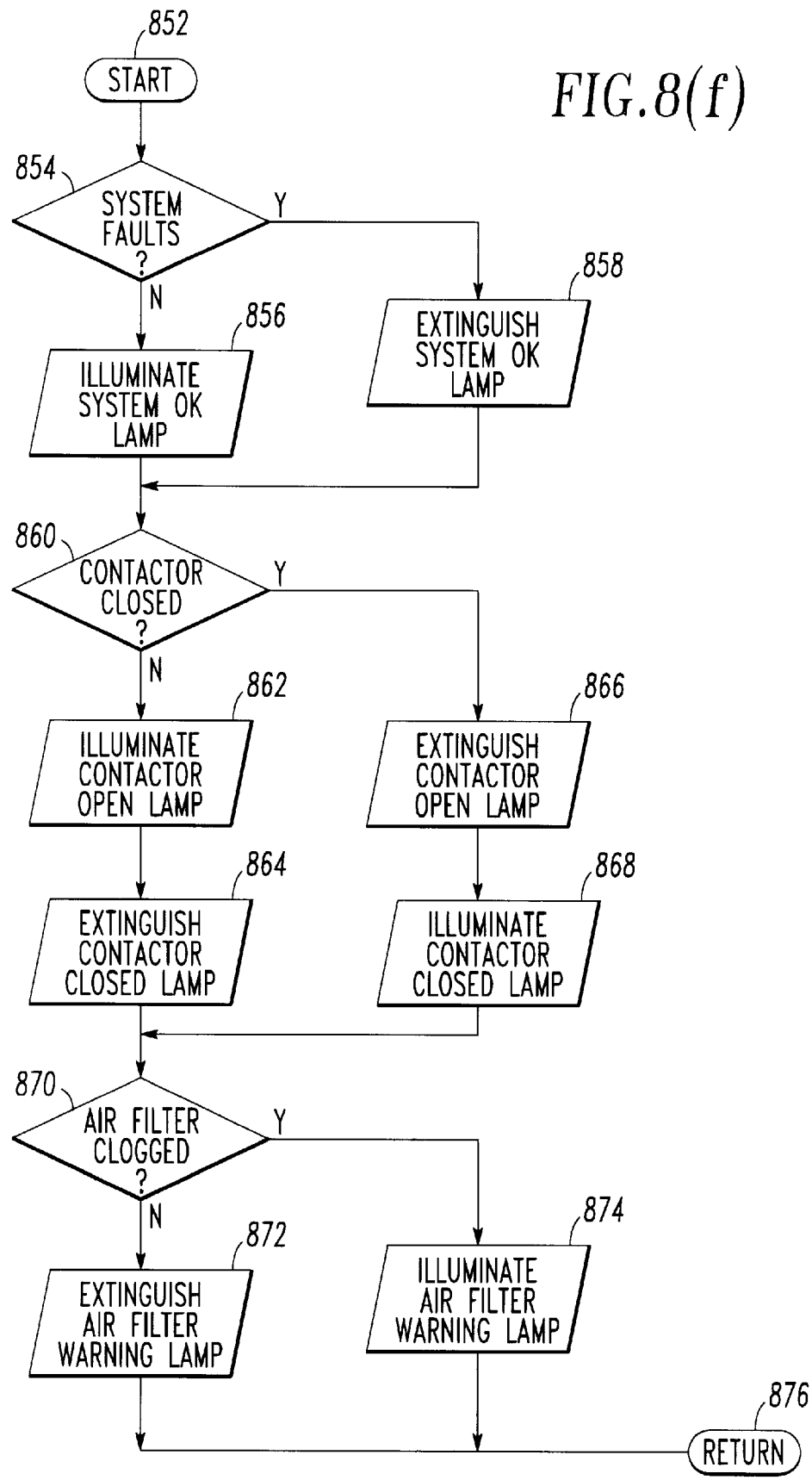
Figure 8G:
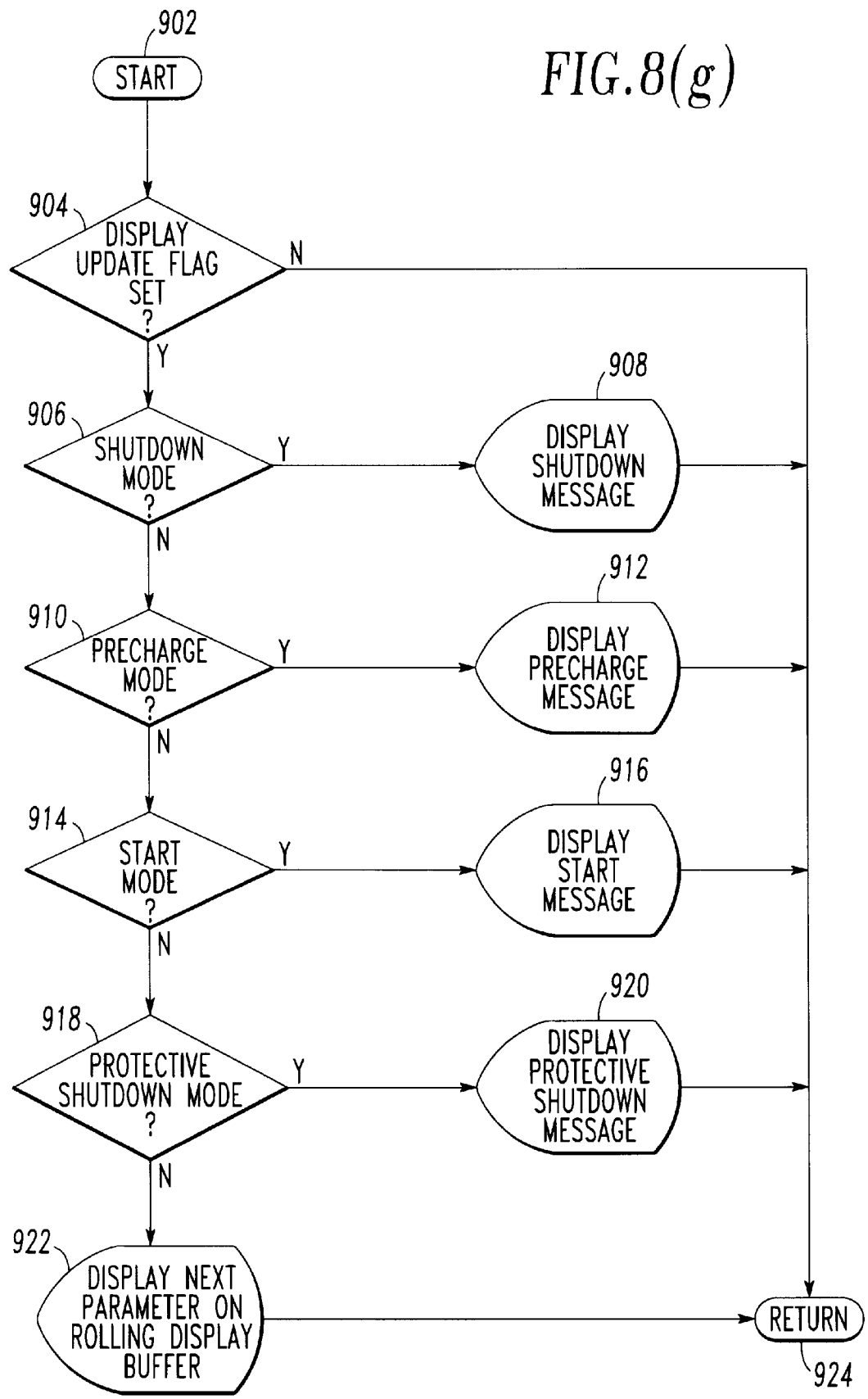

After clock processing step 650, the flow proceeds to input processing step 700, the details of which are shown in FIG. 8(c). In general, the input processing step 700 processes digital data input from the line power unit 100.

The input processing step 700 begins with start step 702 and then proceeds to ground fault decision step 704. If a ground fault has been detected by step 704, then a ground fault is declared in step 708. If not, then the ground fault status is cleared in step 706.

After both steps 706 and 708, the flow proceeds to step 710. Step 710 is a phase fault determination step which determines whether there has been a phase fault in the line power unit 100. Essentially, the phase and sequence detector circuit 97 in the line power unit 100 detects a phase fault condition such as a loss of phase from the utility grid 99. This data is then sent to the LPU controller 200 which relays the phase fault data to the I/O controller 310. This data is then processed by phase fault detection step 710 where, if true, declares a phase fault in step 714.

On the other hand, if no phase fault is detected, then the flow proceeds to step 712 which clears the phase fault status in a corresponding data register or data memory location. After either step 712 or 714, the flow proceeds to step 716.

Step 716 is an emergency stop fault detection step which detects whether the emergency stop button has been activated. If so, an emergency stop fault is declared in step 720; if not, the emergency stop fault status is cleared in step 718. Thereafter, the process proceeds to step 722.

Step 722 is an air filter fault determination step which determines whether there is a fault in the air filter unit in the engine. This step 722 is not a critical step, but it can prevent complications. A typical engine driving the permanent magnet generator 15 contains an air filter. If there is some sort of fault in this air filter, such as a clogged air filter or air filter maintenance required as determined by the engine control unit 12, then an air filter fault data is sent via LPU controller 200 to I/O controller 310. Step 722 determines whether an air filter fault is present. If so, then an air filter fault is declared in step 724. If not, the air filter fault status is cleared in step 726.

Thereafter, the processor 410 determines whether there is a fault in the utility authorization in step 728. Most utility grids send utility authorization to each generator connected thereto. This utility authorization is essentially a permission to connect to the utility grid 99 and feed power thereto. If the utility indicates that connection is not authorized, then a utility authorization fault has occurred and this data is fed to the processor 410. This data is utilized by decision step 728 to determine whether the utility authorization fault condition has occurred. If so, then the flow proceeds to step 732 which declares utility authorization fault condition. If not, then the utility authorization fault status data is cleared in step 730. Thereafter, step 734 is executed.

Step 734 inputs key switch position data and sets status values. The key switch position is determined from a switch or sensor connected to the front panel key switch.

Thereafter, step 736 inputs contactor position data and sets status values. The contactors include contactor K1 which determines whether the line power unit 100 is connected to the grid 99. It is important to know the position of the contactor K1. Other embodiments of the line power unit 100 may utilize other contactors the position of which can be input by step 736. Thereafter, the process is finished as indicated by return step 738.

After the inputs have been processed in step 700, the flow proceeds to host message processing step 750. Host message processing step 750 is a process that essentially prepares and sends messages from the I/O controller 400 to the host computer 235. These messages include, as a primary example, a history log.

The history log is a data file which keeps track of all system performance together with a time stamp, so that one may view the line power unit 100 performance in relation to the real time in which this performance has occurred. This history log may be maintained within a history buffer resident within the nonvolatile random access memory 414 or stored on some other mass storage device connected to processor 410.

The history buffer records information in one of two basic methodologies. The first basic buffering mode is a software mode performed by the remote host computer 235 that records every message sent and received by the host computer 235 on a mass storage media such as a disc along with a time base to indicate the times of these messages. The second history buffer mode is the one utilized in the host message processing step 750 and is essentially a hardware mode in which every message is stored by the processor 410 in the random access memory 414. These messages include system performance along with a time base so that system performance of the line power unit and/or the engine can be recorded. These messages are then send to the host computer 235 utilizing the host message processing step 750, the details of which are shown in FIG. 8(*d*).

The host message processing details are shown in FIG. 8(*d*). This process begins with start step 752 and then proceeds to history log transmission and process decision step 754 which determines whether the history log transmission is in process. If so, then the next history log entry or record is sent by the processor 410 to the remote/host computer 235 via bus 440, serial port B 450, modem 460 and selector 322. If the history log transmission is not already in process, then the flow proceeds to step 756.

Step 756 decides whether the host message flag has been set. If so, the step 758 is performed which parses the host message and sets status and commands within the host message. Thereafter, the flow proceeds to step 760 which prepares and sends the message to the host which ends the process as indicated by return step 774.

On the other hand, if the host message flag has not been set as determined by step 756, then the flow proceeds to step 762 which determines whether the process is attempting to connect and there is time to transmit the message. If so, then step 760 is performed which prepares and sends the message to the host. If not, however, flow proceeds to step 764.

Step 764 determines whether there is a call pending via modem 460 and whether it is time to redial. Step 764 redials after a certain timer period and must, therefore, determine whether the time has arrived for redialing. If yes, then the processor 410 instructs the modem 460 to dial the number of the host computer 235. If not, however, then step 766 decides whether the no response time-out period has expired. If this time period has expired, then the modem 460 is instructed to hang up in step 770. If the time response period is not yet expired, then return step 774 is executed which returns the flow to the main flow shown in FIG. 7.

After the host message processing in step 750 completes, then LPU message processing is performed as indicated by step 800 in FIG. 7.

The details of the LPU message processing 800 is shown in FIG. 8(*e*). LPU message processing begins with start step 802 and then proceeds to time-to-transmit-to-LPU decision step 804. Step 804 essentially determines whether the time has arrived to transmit a message from the I/O controller 310 to the LPU controller 200. Preferably, such messages are transmitted on a scheduled basis or are at least synchronized as determined by step 804. If the time has not yet arrived as determined by step 804, the process returns in step 812.

If the time has arrived to transmit a message to the line power unit 100, then step 806 determines whether there is an incoming message from the line power unit controller 200 that is available for processing. If yes, this input message is parsed by step 808 and the status is set.

If there is no incoming message from the LPU controller 200 available, then step 806 causes the flow to proceed to step 810 which prepares and sends a message to the LPU controller 200. In other words, simultaneous bi-directional communication is not permitted. This is prevented by step 806 which first determines whether there is an incoming message from the LPU available and, if not, then proceeds to prepare and send a message to the LPU controller 200 in step 810. In this way, message flow is controlled to and from the line power unit controller 200 and the I/O controller 310.

After the LPU processing in step 800, lamp processing step 850 is executed, the details of which are shown FIG. 8(*f*). The lamp processing begins with start step 852 and then proceeds to system fault determination step 854. If there are no system faults, as determined by step 854, then step 856 illuminates the system "OK" lamp. On the other hand, if system faults are present, step 858 extinguishes the system "OK" lamp.

After the system "OK" lamp is processed, then the contactor closed determination step 860 is executed which determines whether contactor K1 is closed or opened. If closed, then step 866 extinguishes the contactor open lamp and then step 868 illuminates the contactor closed lamp. On the other hand, if the contactor is open, then step 862 illuminates the contactor open lamp and step 864 extinguishes the contactor closed lamp. After the contactor closed and open lamps are processed, then step 870 is executed.

Step 870 determines whether the air filter is clogged by receiving data from the engine control unit 12. If the air filter is clogged, then the air filter warning lamp is illuminated by step 874 and the process ends as indicated by step 876. On the other hand, if the air filter is not clogged, then the air filter warning lamp is extinguished by step 872 and then the process ends as indicated by step 876.

By utilizing the above lamp processing steps, each of the lamps present on the display 250 can be processed. Such lamp processing unburdens the LPU controller 200. The I/O controller 310 performs these essential tasks. If other lamps are present on the display 250, then additional lamp processing must be performed by lamp processing step 850.

After processing the lamps in step 850, the process proceeds by processing the display in step 900, the details of which are shown in FIG. 8(*g*).

The line power unit 100 may be controlled with a plurality of states or modes. These modes include a shut-down mode, pre-charge mode, start mode, protective shut-down mode, etc. The details of such mode control are described in related application no. 1215-381P the contents of which are hereby incorporated by reference. For the purposes of this communication and remote host invention, it is sufficient to note that the line power unit 100 is controlled in a plurality of pre-determined, distinct modes. Each of these modes permit various processes to occur and the system expects various data to be collected. Thus, it is advantageous to change the display according to the mode utilized by the line power unit 100.

The display processing in step 900 essentially determines which mode the line power unit 100 is currently utilizing and then adapts the display 250 to the selected mode. The display processing in step 900 begins with start step 902 and then proceeds to display update flag set determination step 904. In essence, a display update flag determines whether the display 250 should be updated or not. If this flag has not been set, all of the display processing is skipped as indicated by the flow from step 904 to return step 924. If, however, the display update flag has been set, the flow proceeds to step 906.

Steps 906, 910, 914, 918, respectively determine whether the shut-down, pre-charge, start or protective shut-down modes are currently being utilized by the line power unit 100. Depending upon the current mode, steps 908, 912, 916, 920 display the corresponding shut-down message, pre-charge message, display start message, or protective shut-down message.

In this way, the display 250 on the front panel is adapted to the mode being performed by the LPU controller 200. This permits a smaller and less expensive (e.g. 2×40) alpha-numeric display to be utilized for display 250. This also limits the amount of information presented to the local operator at any given time. In other words, only that information which is relevant to the current operational mode of the line power unit 100, is displayed by display 250. This permits the operator to efficiently monitor only those parameters which are relevant to the current operational mode.

If none of the modes are currently being utilized, then step 922 displays the next parameter on the default rolling display. The contents of this rolling display are stored in a rolling display buffer within, for example, random access memory 414. The rolling display may include such parameters as voltage, current, status, etc. as shown in the exemplary list below.

LIST OF DISPLAY ITEMS

0. Operator Message
1. Power Setpoint
2. Output Power
3. Alternator Output voltage
4. Alternator Output Current
5. Commanded Mode
6. Line Power Unit Mode
7. LPU Starter Speed
8. Cold Plate #1 Temperature
9. Cold Plate #2 Temperature
10. ECU Engine Speed
11. Compressor Inlet Temperature
12. Recuperator Outlet Temperature
13. Turbine Exit Temperature
14. Stator Temperature
15. Bearing Temperature
16. Enclosure Temperature
17. Compressor Inlet Pressure
18. Air Filter Delta Pressure
19. Fuel Nozzle Pressure
20. ECU Analog Spare 1
21. ECU Analog Spare 2
22. ECU Analog Spare 2
23. ECU Shutdowns
24. ECU Spare 3
25. ECU Spare 4
26. Fault Code
27. Line Power Unit Status
28. Communications Processor Status
29. Current Time
30. Turn On Time
31. Turn OffTime
32. Time to Report
33. Report Mode
34. Report Phone Number
35. Software Versions Thereafter, the process returns in step 924.

As shown in FIG. 7, after display processing step 900 is performed, the process loops back to clock processing step 650. In this way, all of the various processes are sequentially performed in an infinite loop basis.

Remote Host Detailed Operation and Screen Displays

Figure 9A:
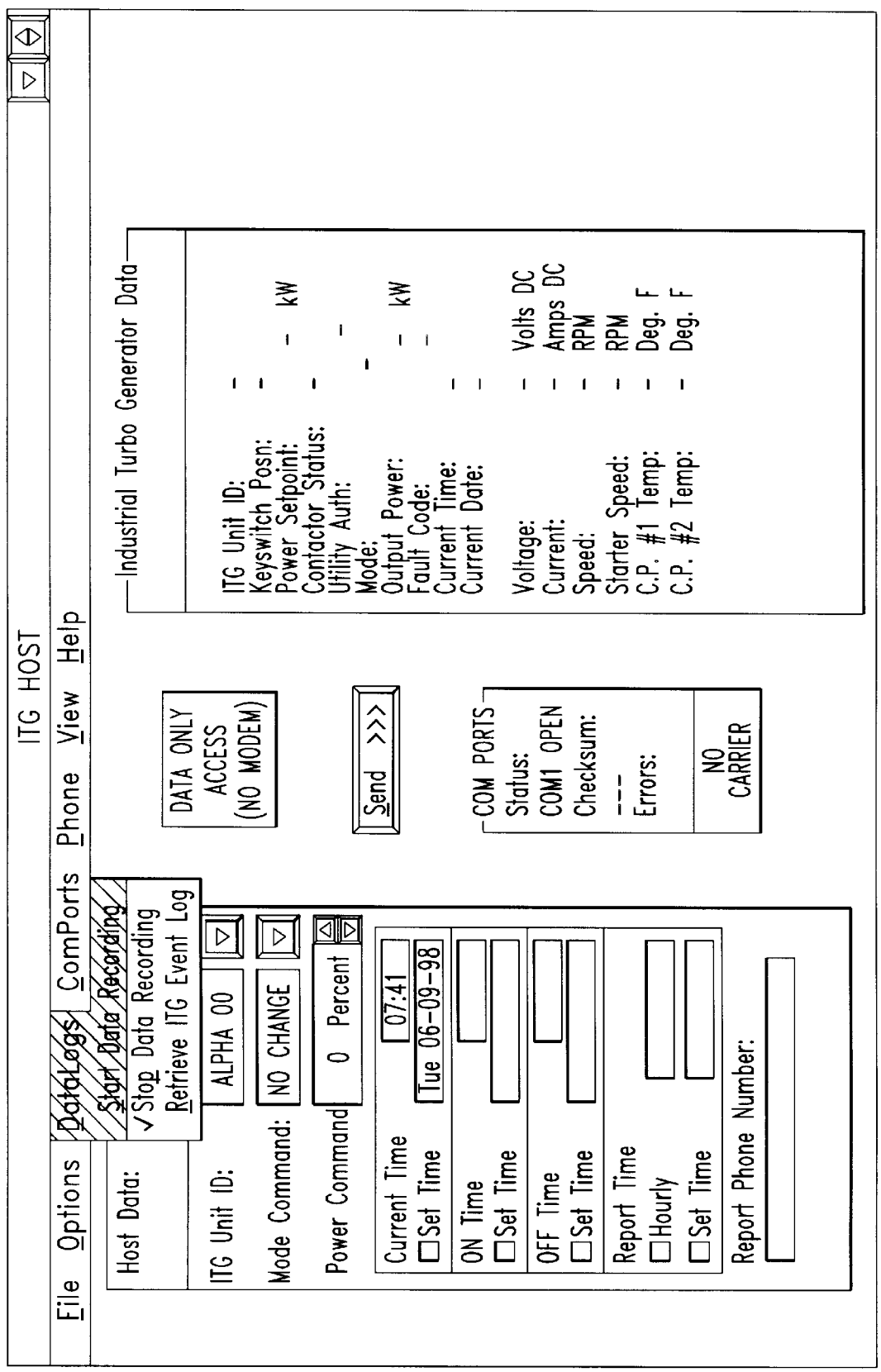
FIGS. 9(a)–(t) are exemplary screen displays generated by the graphical user interface in the remote host according to the invention.

FIG. 9(a)–(t) illustrate exemplary screen displays of a graphical user interface. This graphical user interface permits an operator to interact with the remote host 235 and thereby control the line power unit 100 connected thereto via a direct connection or a modem connection.

In general, this graphical user interface displays various performance data indicating the performance and status of the line power unit 100, engine and permanent magnet generator 15. This graphical user interface also permits the operator to control the line power unit and thereby the engine and permanent magnet generator 15. Various commands such as a power level command, power factor command, and contactor K1 close/open command can be sent from the remote host to the line power unit 100 via this graphical user interface.

Furthermore, the operator can schedule events such as turning on the line power unit 100 at a certain time & date and scheduling any of the commands mentioned above for execution at a scheduled time & date. This graphical user interface also permits the operator to log or record the performance data and status data arriving from the line power unit 100.

FIG. 9(a) illustrates the exemplary graphical user interface. The left side of the graphical user interface displays data relating to the remote host computer 235. The middle section of this graphical user interface displays the connection status including which communication port is active, any check sum errors and whether there is a carrier to carry data between the remote host 235 and the I/O controller 310 and the line power unit 100. The right side of this graphical user interface displays performance data relating to the controlled industrial turbo generator (ITG).

As shown, this performance data includes an ITG unit ID which positively identifies the industrial turbo generator unit being monitored and controlled. This data further includes key switch position, power set point (also known as the power level command), contactor status of contactor K1, utility authorization, mode, output power, fault code, current time, current date, voltage, current, speed, starter speed, C.P. #1 Temp, and C.P. #2 Temp. The term C.P. stands for cold plate which is a cooling device to which the power switching components such as the main inverter 70 and the start inverter 80 are mounted. Monitoring the temperature of these cold plates provides an indication of system performance. These cold plates are typically supplied with coolant that circulates within the cold plate to which the power switching components such as the main inverter 70 and start inverter 80 are mounted. A temperature sensor is located within this cold plate and sends data to the LPU controller, I/O controller 310 and then to the remote host computer 235.

As further shown in FIG. 9(a), the graphical user interface includes a data log selection menu that permits the history data log to start and stop data recording. This menu command also permits retrieval of the ITG event log so that an operator can analyze, debug, or otherwise monitor past performance stored in an event log. The ITG event log is preferably a 100 second buffer that records all data occurring within the last 100 seconds. The time interval can be adjusted as appropriate.

FIG. 9(b) further illustrates the communication port menu selection that permits the operator to select which of the communication ports 1–4 should be utilized to send and receive data from the host computer 235 to the I/O controller 400. As shown in FIG. 9(b), communication port 1 is selected. The results of this selection are shown in the middle of the screen in the COM Ports status which shows that COM 1 is open. Because the modem is not connected to a data line, this middle screen section also shows that no carrier is present.

Figure 9C:
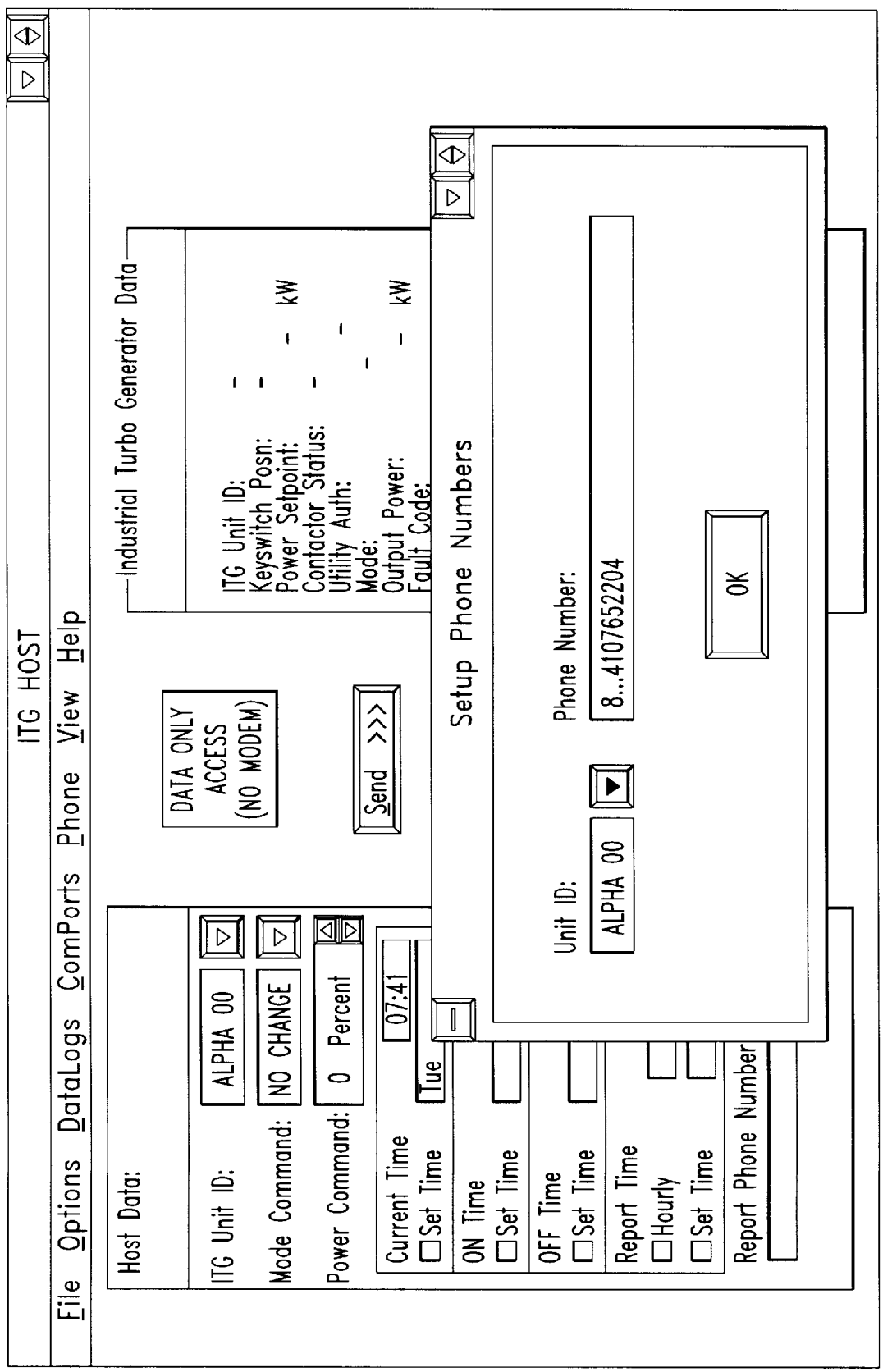

FIG. 9(c) illustrates the phone number set up screen that permits an operator to assign the phone number of each of the ITG units. This is particularly helpful when a single remote host is used to control more than one ITG. Each ITG can be assigned a phone number to call the corresponding modem 460 in the corresponding line power unit 100.

FIG. 9(d) illustrates data log retrieval. A desired ITG Event Log may be retrieved according to the number of records desired which starts from a starting record number. The bottom of this graphical user interface displays the file status including which record is currently being processed. A start and cancel button may be activated once the number of records and starting record data have been entered.

Figure 9E:
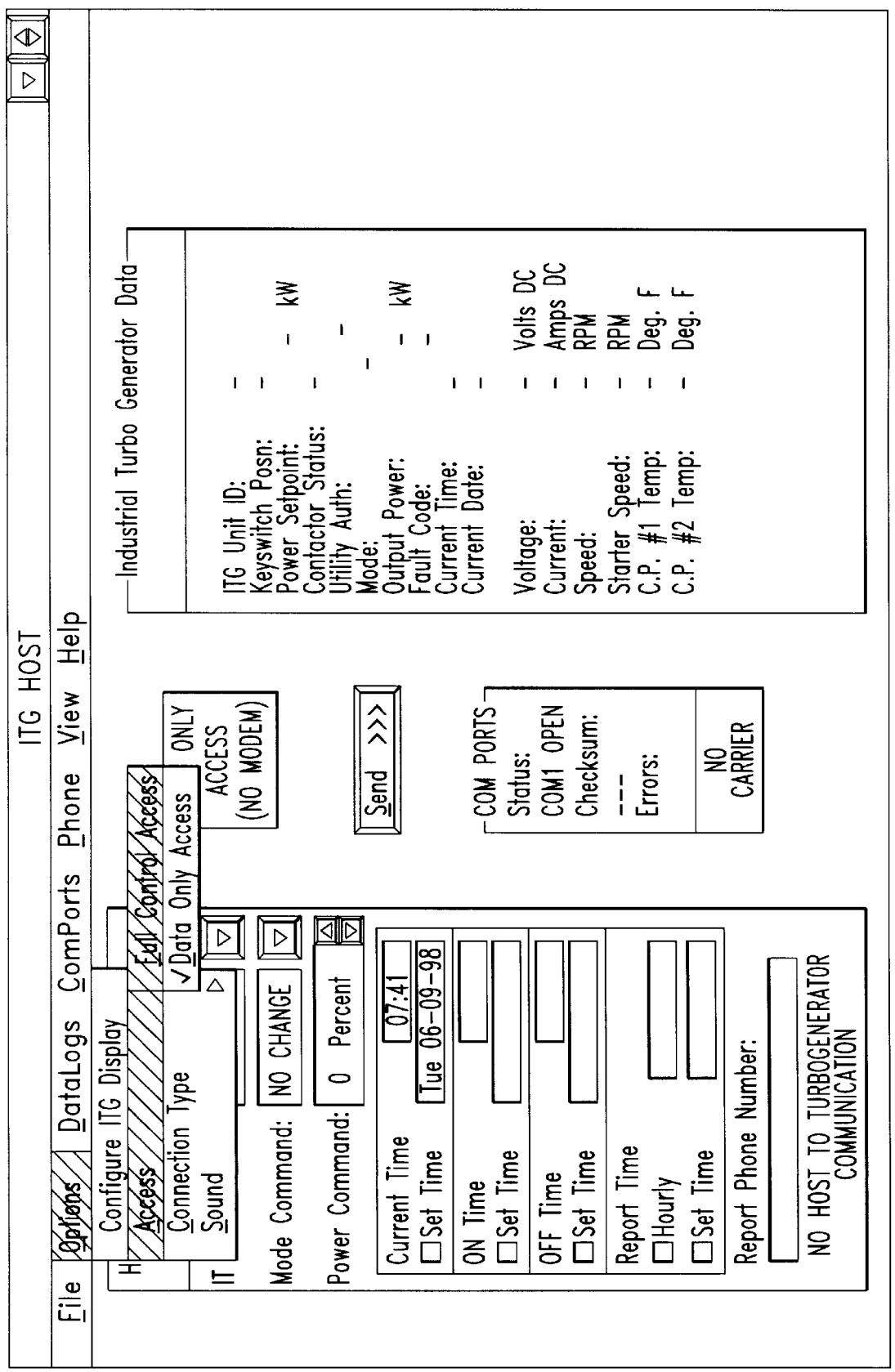

FIG. 9(e) illustrates a basic choice for system access. Under the options menu selection, the access menu selection can be chosen. Thereafter, a choice is made between full control access and data only access. This provides a degree of security control. Full control access is only permitted after successful password entry as shown in FIG. 9(g). Data only access, however, is more permissive and does not require a password. Alternatively, a password could be provided for the data only access and a second password for the full control access.

Figure 9F:
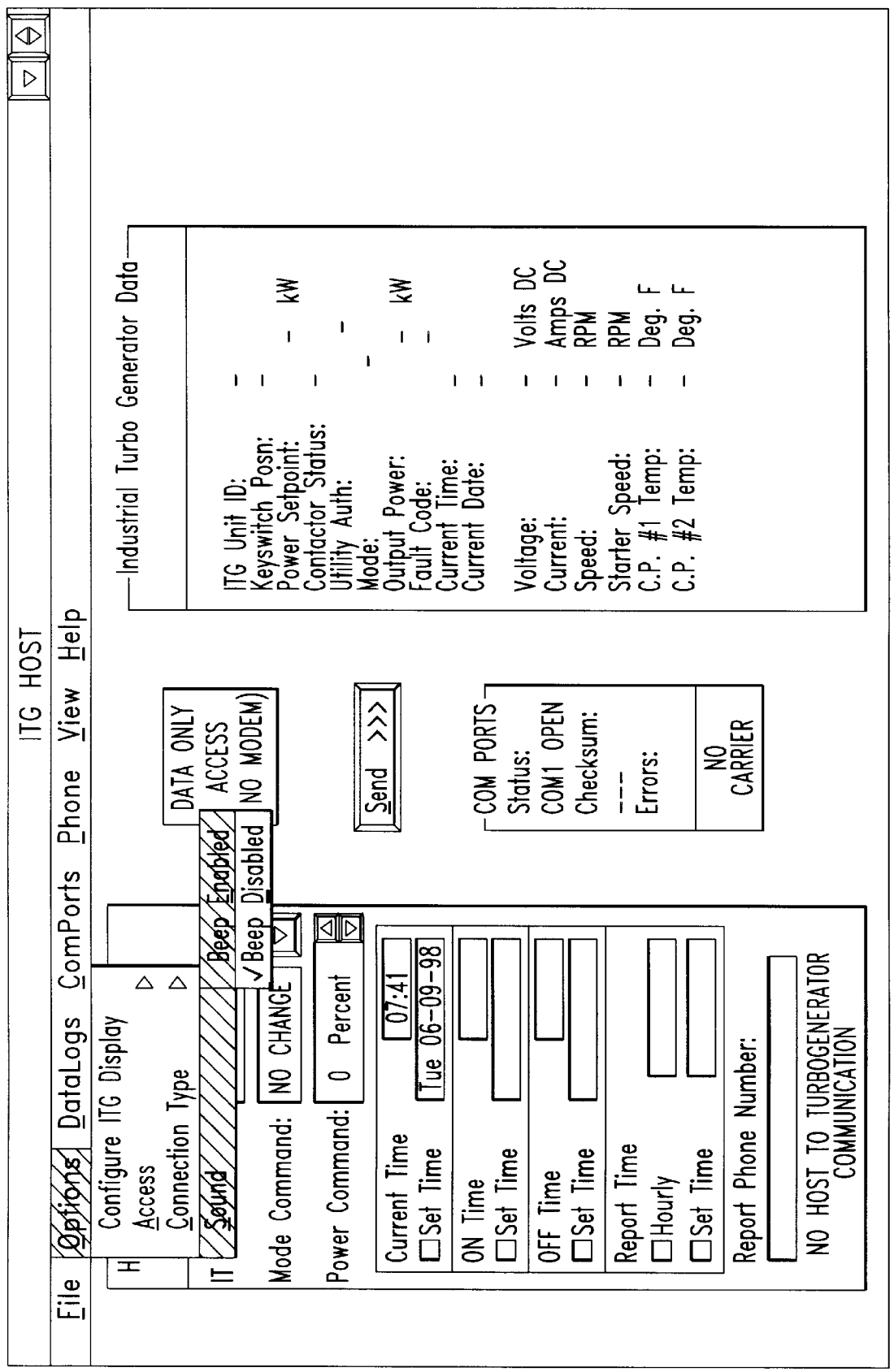
Figure 9G:
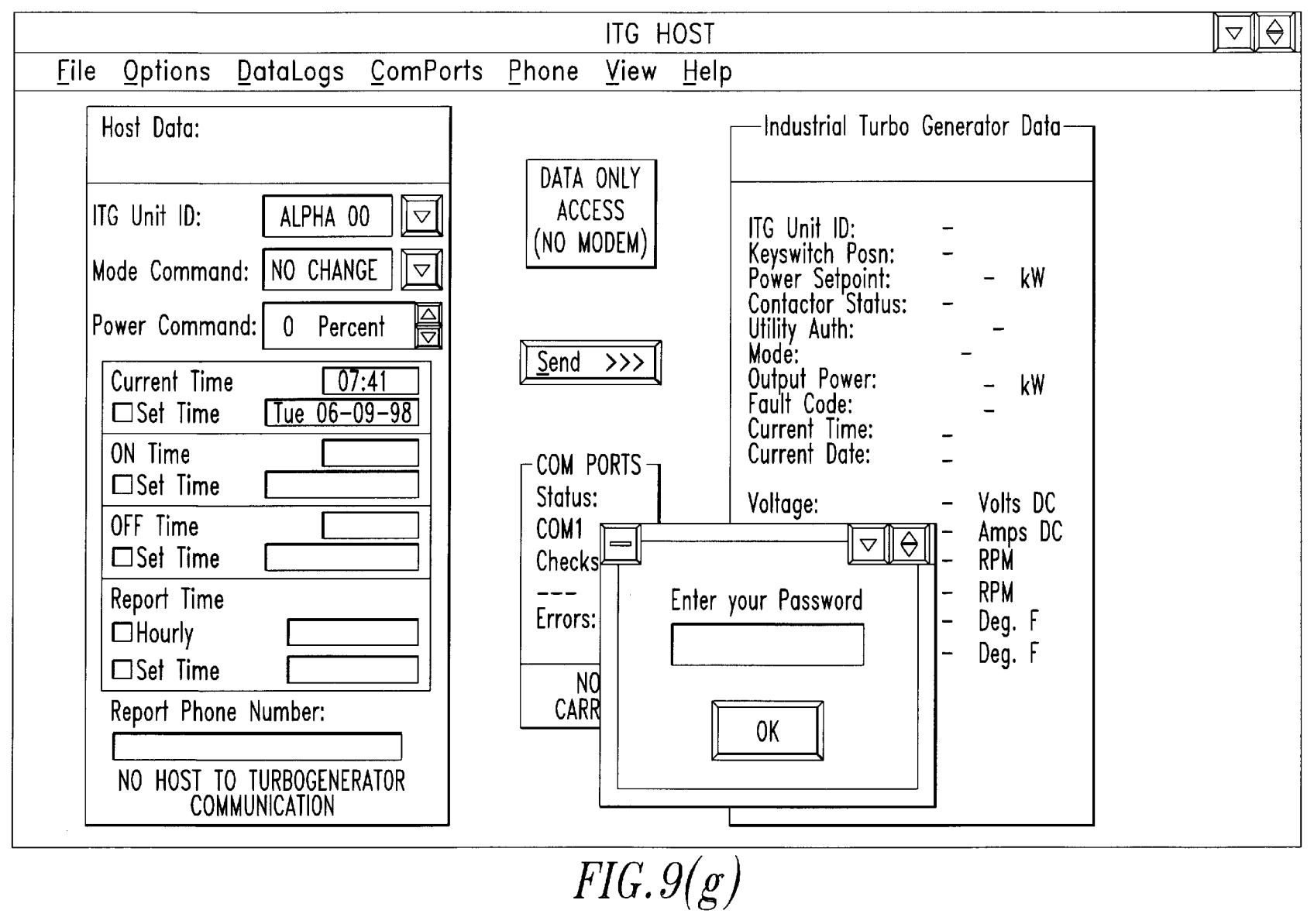

FIG. 9(f) permits the operator to select an audio output. By enabling the "beep" in the sound option selection, the system will beep or otherwise generate an audio cue upon message retrieval or fault condition. This further enables the operator to most efficiently utilize the remote host.

FIG. 9(h) illustrates how the operator exits the remote host with a file, exit command in the menu selection.

Figure 9I:
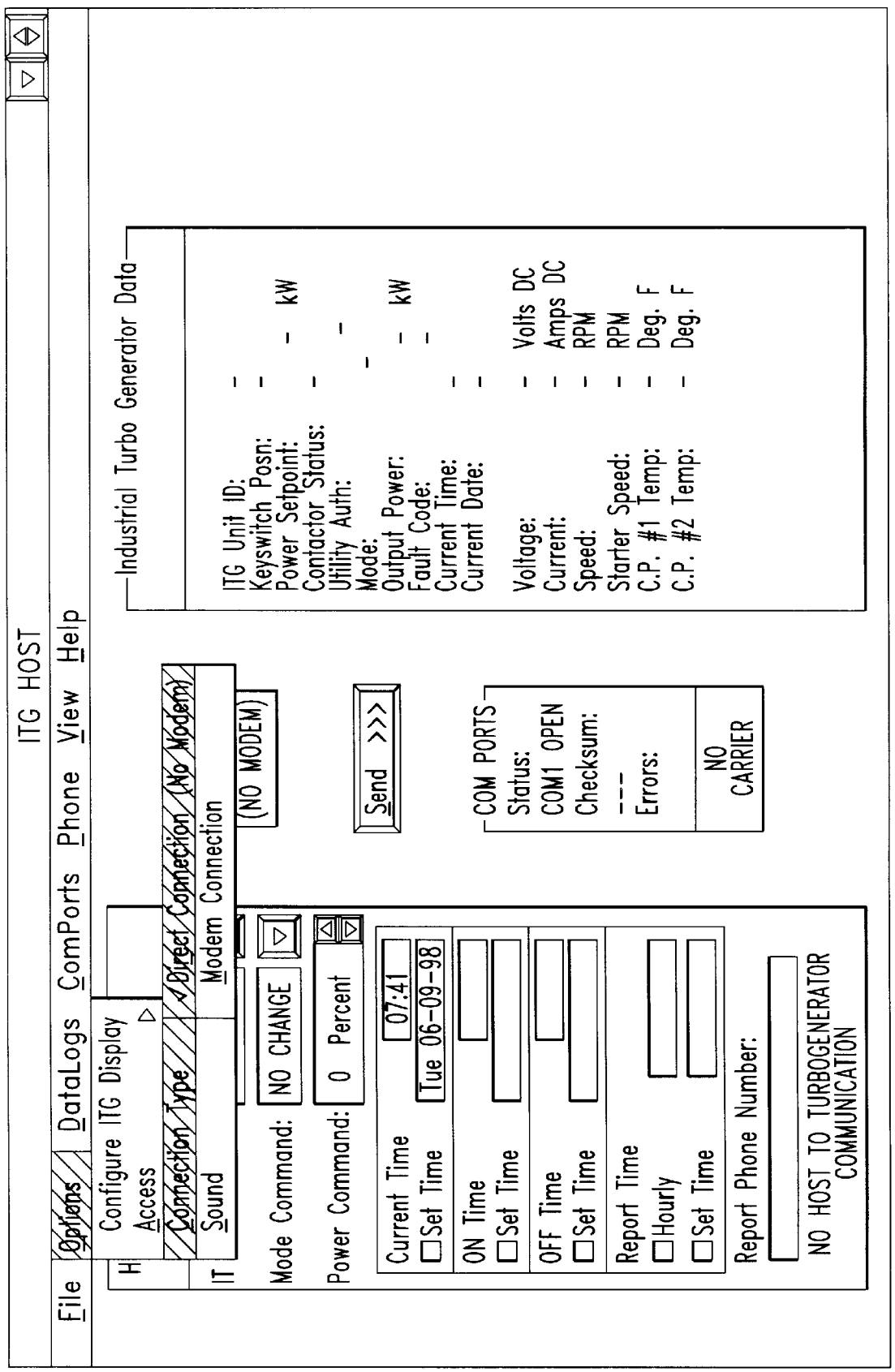

FIG. 9(i) permits the operator to select the connection type with the choices being a direct connection or a modem connection. This selection sends a signal to the selector 322 to select between the modem and direct connections as described above.

FIG. 9(j) illustrates the modem connection. More particularly, the operator can select the dial command which will dial the previously entered phone number for the selected ITG unit. Further selections include hang up and set up numbers which permits the operator to set up phone numbers for each of the ITG units as described above.

Figure 9K:
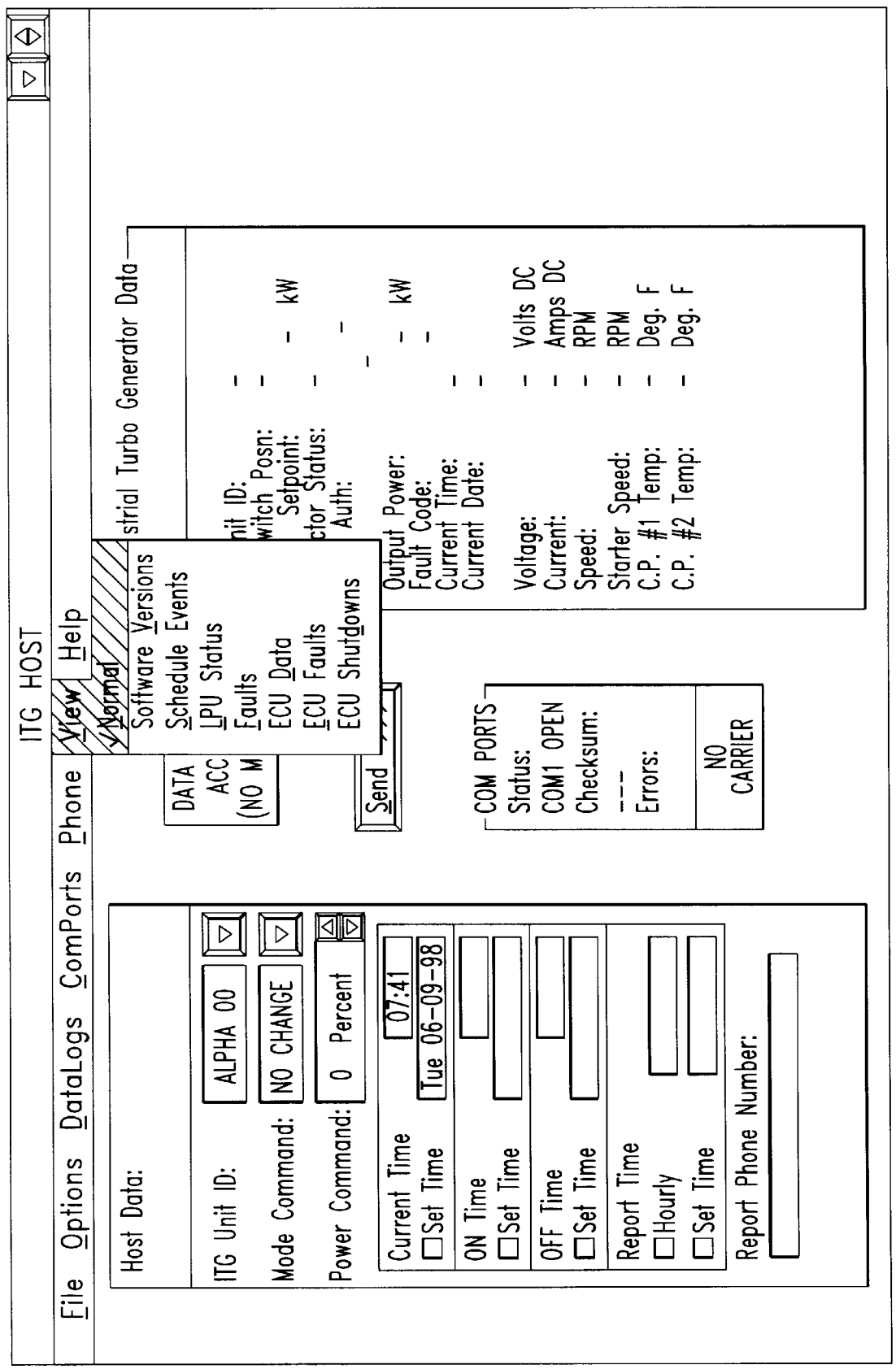
Figure 9N:
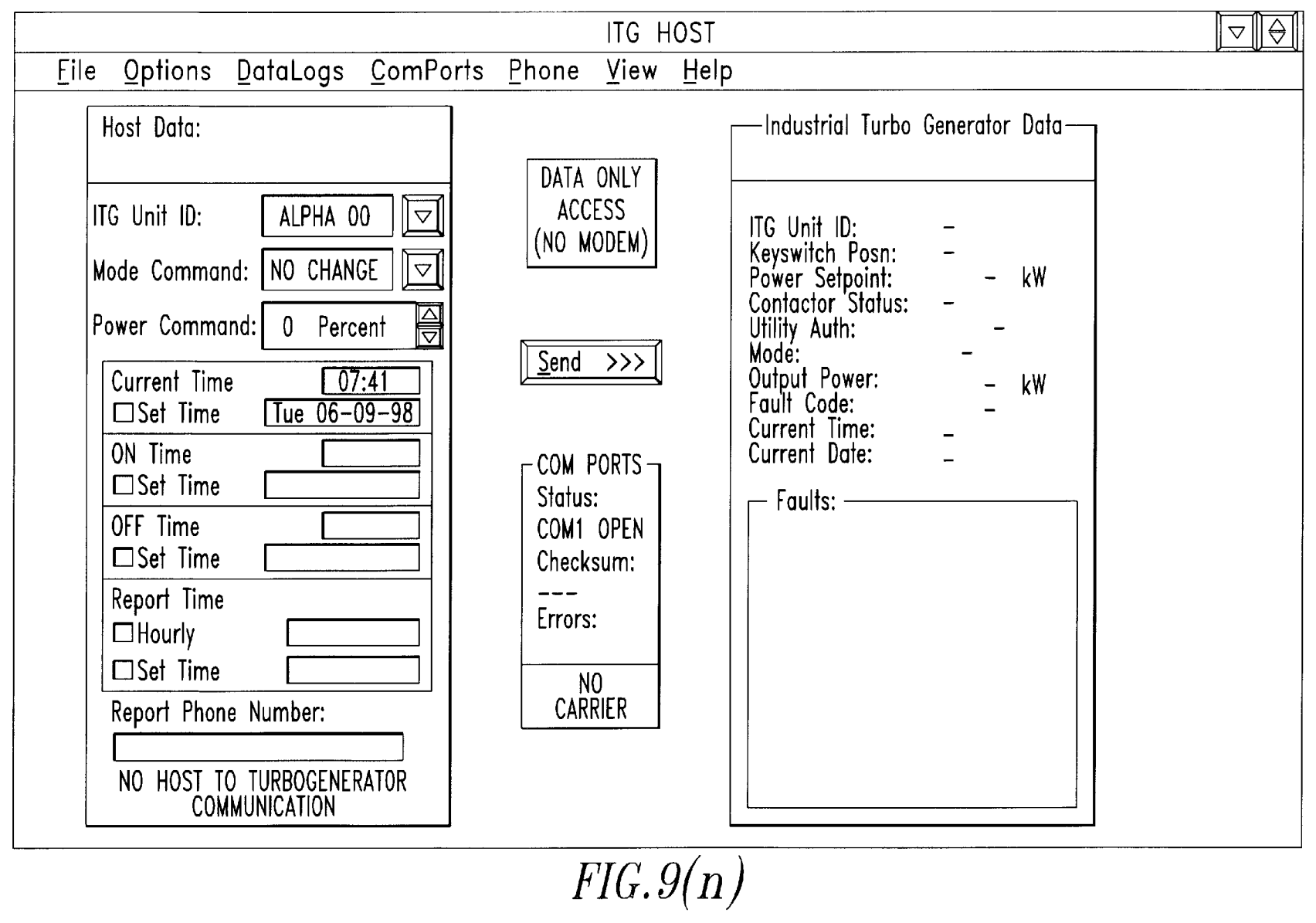
Figure 9Q:
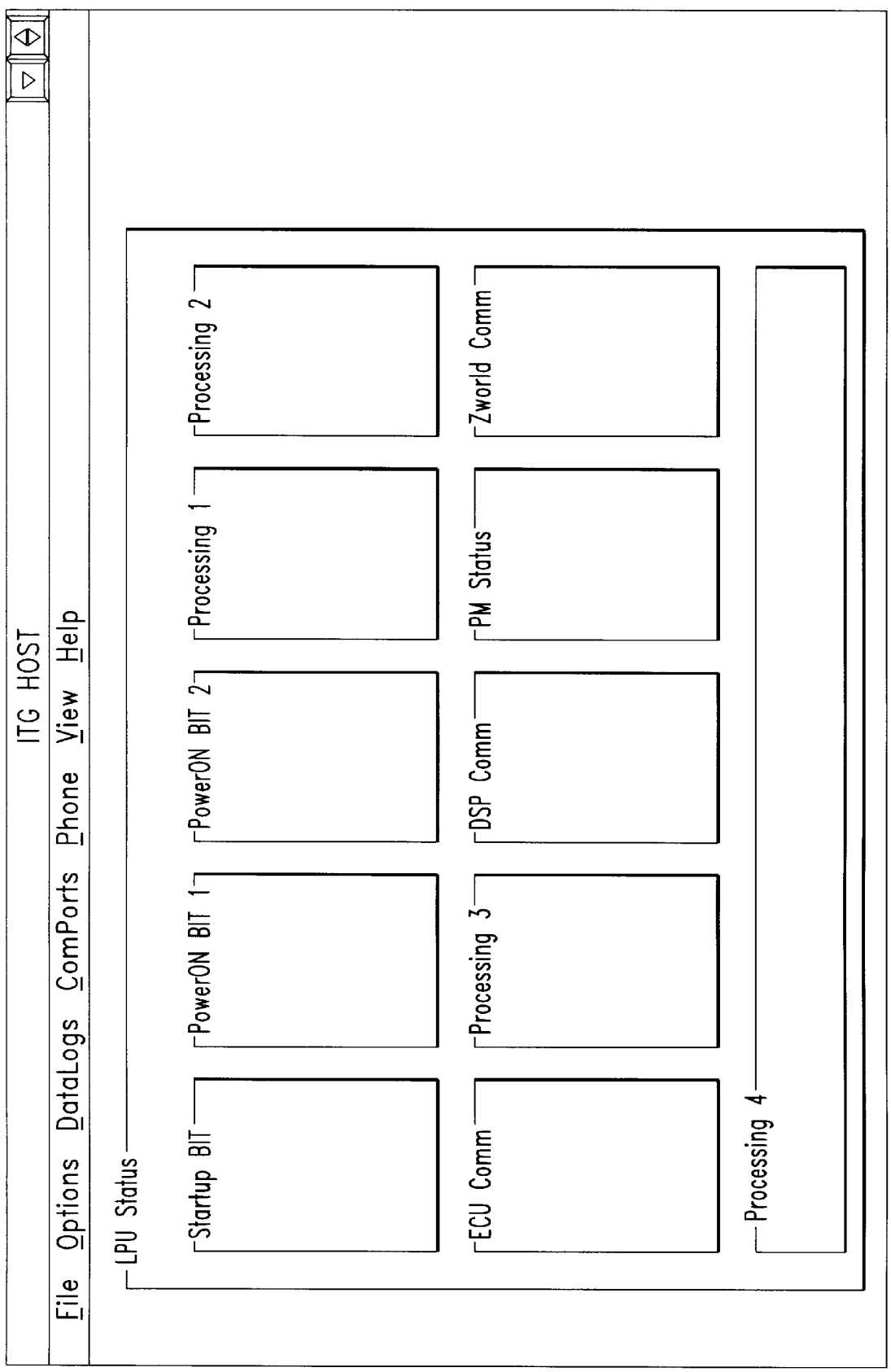

FIG. 9(k) illustrates the view selection command which includes the normal view which is illustrated in FIGS. 9(a)–(j), the software versions screen which shows the current software version being utilized, the scheduled events screen which permits the operator to schedule various events, the LPU status screen showing the status and performance data for the LPU 100, the ECU data screen flowing data for the engine control unit 12, the ECU fault screen showing any faults occurring in the engine control unit 12, and the ECU shutdown screen.

FIG. 9(l) further illustrates the ECU fault screen wherein various engine control unit faults are illustrated on the right side of the graphical user interface.

FIG. 9(m) further illustrates the ECU shutdown view which illustrates any ECU or engine shutdown to the operator.

FIG. 9(n) illustrates the faults view showing any current faults in the system.

FIG. 9(o) illustrates the ECU data screen showing performance data for the engine control unit 12 and the engine that this ECU 12 controls. The ECU data includes engine speed, compressor input temperature, recuperator output temperature, turbine output temperature, stator temperature, bearing air temperature, enclosure temperature, compressor input pressure, and air filter pressure. The ECU data will change according to the type of engine being controlled by the engine control unit 12.

FIG. 9(*p*) illustrates the scheduled events view showing all scheduled events for the selected ITG unit. Scheduled events include the power setpoint (power level command in kilowatts), the on time & date, off time & date, report time & date, report mode, and phone number.

FIG. 9(*q*) illustrates the LPU status view. The LPU status screen shown in FIG. 9(*q*) is a bit-by-bit display of each current status bite. Depending upon the bit structure used for the status byte, this display will change.

FIG. 9(*r*) illustrates the software version screen showing the software versions of the ITG host, communications processor 310, LPU digital signal processor, LPU microcontroller 200, and engine control unit 212.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

We claim:

1. A system for remotely controlling a line power unit that delivers electrical power to a grid from a electrical power source, comprising:

said line power unit including a full wave rectifier connected to the electrical power source, said full wave rectifier converting a three phase AC voltage from the electrical power source to a DC voltage;

a DC bus connected to the output of said full wave rectifier;

an inverter connected to said DC bus, said inverter functioning as a current source and transforming the DC voltage to a controlled three phase alternating voltage;

an inductor unit connected to the output of said inverter;

a first contactor unit selectively connecting and disconnecting said inductor unit to and from the grid;

a line power unit controller connected to said inverter and a power level command input;

an external interface connected to an external communication device communicating data and command signals to and from a remote terminal; and an I/O controller connected to said external interface and said line power unit controller, said I/O controller receiving data signals from said line power unit and controlling and routing the data signals to the remote terminal via said external interface;

said I/O controller receiving command signals from the remote terminal via said external communication device and routing the control signals to said line power unit controller, said line power unit controller receiving a power level command from said I/O controller and controlling said inverter to transform the DC voltage to a controlled three phase alternating voltage having the commanded power level.

2. The system according to claim 1, further comprising: a display for displaying the command and data signals.

3. The system according to claim 1, wherein the data signals include performance data relating to performance of the line power unit, the system further comprising:

a history buffer storing performance data, said I/O controller controlling said external interface to relay the performance data to the remote terminal upon receiving an upload command from the remote terminal or said line power unit controller.

4. The system according to claim 3, further comprising:

a real time clock, said history buffer recording all transmissions sent and received by said I/O controller in a mass storage media along with a time base derived from said real-time clock.

5. The system according to claim 1, wherein said remote terminal is a remote host including an operator interface, display means, real time clock, memory, and a data processing device;

said remote host permitting an operator to send the power level command, a start engine command, a pre-charge initiate command, an inverter enable command, an inverter disable command, a first contactor unit control command, an emergency stop command, utility authorization data, a shutdown command, and/or a restart command;

said I/O controller also relaying data to said remote host including grid voltage, system status data, DC bus voltage data, front panel display parameters, current data, loss of phase data, and/or contactor position data.

6. The system according to claim 5, wherein the electrical power source is an electrical generator, the system further comprising:

an engine for driving the electrical generator, and a sensor for monitoring the engine to produce engine related data, said I/O controller relaying engine related data to the remote host.

7. The system according to claim 5, said remote host further including a real time clock, said operator interface permitting the operator to input data including start and stop times and power levels for operating the device and store said data in the memory of the remote host and/or in a memory of said I/O controller, said remote host controlling the device according to the data stored in the memory by comparing the times with the real time kept by said real time clock.

8. The system according to claim 7, said operator interface permitting the operator to input real-time clock setting data that sets said real time clock, said remote host or said I/O controller sending commands to the line power unit controller according to the data stored in the memory by comparing the times with the real time set by the real-time clock setting data and kept by said real time clock.

9. The system according to claim 1, further comprising:

a front panel including indicating devices for indicating status data, said I/O controller driving the front panel indicating devices according to received status data received from said line power unit controller and/or the remote terminal.

10. The system according to claim 9, said indicating devices including a scrolling alphanumeric display displaying selectable device status data in a scrolling format.

11. The system according to claim 2, wherein a content of the data is determined by a control state of the line power unit.

12. The system according to claim 1, said I/O controller periodically sending status reports to the remote terminal indicating status of the line power unit.

13. The system according to claim 12, said I/O controller periodically sending the status reports to the remote host according to a preset schedule.

14. The system according to claim 1, said I/O controller sending the status reports to the remote host upon a fault condition.

15. A computer implemented method for remotely controlling and monitoring electric power transformation in a device having a full wave rectifier connected to an electrical power source, a DC bus connected to the output of the full wave rectifier, an inverter connected to the DC bus, an inductor unit connected to the output of the inverter, a first contactor unit selectively connecting and disconnecting the inductor unit to and from a grid, a pre-charge circuit connected to the DC bus, a line power unit controller connected to the inverter and a power level command input, the computer implemented method comprising the steps of:

receiving device status data from the device including output power, DC bus voltage, and DC bus current;

displaying a graphical user interface on a display device;

said display step displaying the received device status data;

inputting a power level command via the graphical user interface; and sending the power level command to the device, wherein the line power unit controller receives the power level command from the power level command input and controls the inverter to transform the DC voltage to a controlled three phase alternating voltage having the commanded power level.

16. The method according to claim 15, further comprising the step of:

displaying a connection status indicating status of a carrier that carries the device status data and the power level command.

17. The method according to claim 15, wherein the electrical power source is an electrical generator, the device further including an engine for driving the electrical generator, the device status data further including performance data indicating performance of the engine, said display step displaying the performance data.

18. The method according to claim 17, the device further including a start inverter for driving the electrical generator as a motor to spin the engine to permit the engine to be started, the device status data further including engine starting data indicating status of engine status during starting and a speed of the electrical generator being driven as a motor to spin the engine.

19. The method according to claim 15, said device status data further including contactor status data indicating a connection or disconnection state of the first contactor with respect to the grid.

20. The method according to claim 15, further comprising the step of:

receiving utility authorization data from a utility company supplying power to the grid, said display step displaying the utility authorization data.

21. The method according to claim 20, further comprising the step of:

sending the utility authorization data to the device.

22. The method according to claim 15, said device status data including temperature data indicating a temperature of the device.

23. The method according to claim 15, further comprising the step of:

receiving fault status data from the device, said display step displaying the fault status data.

24. The method according to claim 15, further comprising the steps of:

inputting a mode command via the graphical user interface, wherein the mode command includes a no-change mode, a run mode, and a stop mode; and sending the mode command to the device.

25. The method according to claim 15, further comprising the step of:

inputting a password authorizing command level access;

verifying the password; and permitting said power level sending step to send the power level command to the device only upon successful verification by said verifying step.

26. The method according to claim 15, the device further including a key switch having a remote control position, a local control position, and an off position, the method further comprising the steps of:

receiving key switch position data from the device; and displaying the key switch position data.

27. The method according to claim 26, further comprising the steps of:

permitting said power level sending step to send the power level command to the device only when the received key switch position data indicates the remote control position.

28. The method according to claim 15, the method controlling and monitoring a plurality of the devices, said method further comprising the steps of:

assigning an identification code to each of the devices;

inputting the identification code via the graphical user interface; and updating the display based on the inputted identification code;

said sending and receiving steps sending the data and commands using discrete messages each of which contains one of the identification codes uniquely identifying one of the devices, wherein each of the devices responds to the discrete message if the identification code matches the assigned device identification.

29. The method according to claim 15, further comprising the steps of:

measuring output power output from the inverter;

measuring DC bus voltage and current; and sending device status data including output power, DC bus voltage, and DC bus current to a remote host computer implementing the method.

30. A system for remotely controlling a plurality of line power units that deliver electrical power to a grid, comprising:

each of said line power units including a full wave rectifier connected to a three phase electrical power source, said full wave rectifier converting a three phase AC voltage from the three phase electrical power source to a DC voltage;

a DC bus connected to the output of said full wave rectifier;

an inverter connected to said DC bus, said inverter functioning as a current source and transforming the DC voltage to a controlled three phase alternating voltage;

an inductor unit connected to the output of said inverter;

a first contactor unit selectively connecting and disconnecting said inductor unit to and from the grid;

a line power unit controller connected to said inverter and a power level command input, said line power units connected in parallel to the grid;

a master controller for controlling said plurality of line power units;

a local bus interconnecting said line power units and said master controller, said local bus communicating data and control signals;

wherein each said line power unit controllers receives a power level command from said master controller and controls a corresponding one of said inverters to transform the DC voltage to a controlled three phase alternating voltage having the commanded power level.

31. The system according to claim 30, said master controller polling each of said line power units on a round robin basis via said local bus.

32. The system according to claim 31, said master controller favoring one or more of said line power units during the round robin polling such that the one or more of said line power units is polled a greater number of times than other of said line power units during the round robin.

33. The system according to claim 30, said master controller balancing power delivered by said plurality of line power units to the grid by adjusting the power level commands sent to each line power unit via said local bus.

34. The system according to claim 30, said local bus including optical isolators for connecting said line power units to said bus.

35. The system according to claim 30, said local bus including a plurality of busses connected to said master controller.

36. The system according to claim 30, said master controller sending power level commands and power factor commands to each of said line power units via said local bus.

37. The system according to claim 36, said master controller sending the power level command and power factor commands in discrete messages, wherein each discrete message contains a identification value uniquely identifying one of said line power units, each of said line power units only responding to the discrete message if the identification value matches said line power unit.

38. The system according to claim 37, said line power units responding to the discrete message with a response message indicating line power unit status.

39. The system according to claim 38, the response message including the identification value of said line power unit, a current power level, and current power factor.

40. The system according to claim 30, further comprising:

a second master controller connected to said local bus, said second master controller providing redundant control over said plurality of line power units.

41. The system according to claim 30, further comprising:

a remote host located remote from said master controller, said remote host connected to said master controller through a communication medium, said remote host sending commands to said master controller to control operation of said line power units.

* * * * *